US008675506B2

(12) United States Patent
Takase et al.

(10) Patent No.: US 8,675,506 B2
(45) Date of Patent: Mar. 18, 2014

(54) NETWORK SYSTEM, EDGE NODE, AND ACCESS DEVICE

(75) Inventors: Masayuki Takase, Fujisawa (JP); Hideki Endo, Kokubunji (JP); Yoshihiro Ashi, Yokohama (JP); Nobuyuki Yamamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 458 days.

(21) Appl. No.: 12/342,317

(22) Filed: Dec. 23, 2008

(65) Prior Publication Data
US 2009/0161573 A1 Jun. 25, 2009

(30) Foreign Application Priority Data

Dec. 25, 2007 (JP) ................................. 2007-331846
Oct. 8, 2008 (JP) ................................. 2008-261895

(51) Int. Cl.
*G06F 11/00* (2006.01)

(52) U.S. Cl.
USPC ........................................................ 370/252

(58) Field of Classification Search
USPC ........................................................ 370/252
See application file for complete search history.

(56) References Cited

U.S. PATENT DOCUMENTS

| 6,813,245 | B1 * | 11/2004 | Furuno ........................ 370/236 |
| 2005/0122957 | A1 * | 6/2005 | Ambe ........................... 370/351 |
| 2007/0147260 | A1 * | 6/2007 | Schwarzmann .............. 370/242 |
| 2008/0037578 | A1 * | 2/2008 | Carlson et al. ................ 370/463 |
| 2008/0049757 | A1 * | 2/2008 | Bugenhagen .............. 370/395.1 |
| 2009/0154478 | A1 * | 6/2009 | Sridhar et al. ................ 370/401 |
| 2010/0226244 | A1 * | 9/2010 | Mizutani et al. .............. 370/220 |

FOREIGN PATENT DOCUMENTS

JP 2001-111564 4/2001
WO PCT/JP2006/315494 * 2/2007

\* cited by examiner

*Primary Examiner* — Mark Rinehart
*Assistant Examiner* — Christopher R Crompton
(74) *Attorney, Agent, or Firm* — Antonelli, Terry, Stout & Kraus, LLP.

(57) ABSTRACT

In order to specify a data discarding point in a network, provided is a network system for collecting, in the network including an access network and a transport network, pieces of statistical information including a traffic amount of the network, including: an access terminal coupled to the access network; and an edge node for interconnecting the access network and the transport network, in which: the access terminal is configured to: measure pieces of statistical information including a traffic amount in the access terminal; and notify the edge node of the measured pieces of statistical information; and the edge node collects the pieces of statistical information notified by the access terminal.

10 Claims, 18 Drawing Sheets

| ADDRESS | |
|---|---|
| 0□0000 | DEVICE ALARM CODE 1 |
| 0□0001 | DEVICE ALARM CODE 2 |
| 0□0002 | DEVICE ALARM CODE 3 |
| 0□0003 | DEVICE ALARM CODE 4 |
| 0□0004 | NUMBER OF TRANSMITTED BYTES FOR PORT 0 |
| 0□0005 | NUMBER OF TRANSMITTED BYTES FOR PORT 0 |
| 0□0006 | NUMBER OF RECEIVED BYTES FOR PORT 0 |
| 0□0007 | NUMBER OF RECEIVED BYTES FOR PORT 0 |
| ⋮ | ⋮ |
| 0□XXXX | FLOW-IN BANDWIDTH FOR PORT 0 |
| 0□XXXX | FLOW-IN BANDWIDTH FOR PORT 0 |

NETWORK SYSTEM, EDGE NODE, AND ACCESS DEVICE

CLAIM OF PRIORITY

The present application claims priority from Japanese applications JP2007-331846 filed on Dec. 25, 2007, and JP2008-261895 filed on Oct. 8, 2008, the contents of which are hereby incorporated by reference into this application.

BACKGROUND OF THE INVENTION

This invention relates to a technology of collecting statistics of an amount of data transferred to a network and pieces of alarm information from an access terminal for housing a user terminal installed at a remote place.

Carriers that provide guarantee type communication services in place of conventional dedicated-line services by using a packet transfer network have increased. The guarantee type communication services are services in which carriers install access terminals at user sites, and the carriers guarantee contracted communication bandwidths between the access terminals.

A representative example of the packet transfer network is the Internet. The Internet is a service based on best effort. Thus, there is a fear that data may be discarded in the middle of a path. However, how much and where data is discarded does not have to be figured out.

On the other hand, in the service that guarantees a contracted communication bandwidth, when data transmitted from the user terminal abiding by the guaranteed bandwidth is discarded in the packet transfer network provided by the carrier, it is violation of a contract, and the carrier accordingly has to pay a penalty.

A network for interconnecting the user sites may be configured not by a single network but by a plurality of networks such as an access network and a transport network. The plurality of networks may be administered by different administration companies.

Thus, when data is discarded or when a communication failure occurs, a failure occurring in the network including the access terminal, or a place where data has been discarded has to be specified to clarify a locus of responsibility.

The transport network includes an edge node and a transport node for interconnecting an access network and the transport network. In the transport network, a control network for setting control information may be coupled to the nodes. An administrator of the transport network can monitor statistical information of data passing through the transport node or information of a failure occurring in the transport node by means of the control network.

One of communication protocols for constructing the transport network is ATM. In the ATM, operation administration and maintenance (OAM) is defined. The OAM of the ATM includes failure notification from the transport node, and collection of pieces of statistical information limited within an application range of the OAM.

SUMMARY OF THE INVENTION

No control network is coupled to the access terminal installed at the user site as opposed to the case of the transport node. Thus, pieces of statistical information collected at the access terminal cannot be recovered through the control network as opposed to the case of the edge node or the transport node. Additionally, pieces of failure information collected together with the pieces of statistical information at the access terminal cannot be recovered through the control network as opposed to the case of the edge node or the transport node.

A technology disclosed in JP 2001-111564 A is for collecting pieces of statistical information in a section monitored by the OAM of the ATM. When an access network is ATM, use of this technology enables acquisition of statistics of an amount of data transferred from the access terminal to the access network. However, statistical information obtained by this technology is only statistics of data transferred to the access network. In other words, by this technology, statistical information outside a range of the OAM, for example, an amount of data flowing from the user terminal into the access terminal, cannot be obtained.

The administrator is inhibited from obtaining, in addition to the statistical information, device failure information such as a component failure unique to the access terminal, and communication alarm information such as a communication error detected as a result of a continuity check test performed by the access terminal with a communication device as a communication partner.

Thus, when data is discarded in the access network, it is difficult to specify whether a cause of the data discarding is the amount of data flowing from the user terminal to the access terminal exceeding a contracted bandwidth or a problem with the access terminal, and to specify whether or not the data discarding has occurred at a point other than the access terminal. As a result, a locus of responsibility for violation of the contract is unclear.

Depending on an installing position of the access terminal, the number of user terminals housed in the access terminal, and the number of user terminal housing ports disposed in the access terminal, statistical information or alarm information (including device failure information or communication alarm information) to be obtained changes in a various manner.

In the case of the conventional art, pieces of information to be obtained have to be uniform, and acquisition and selection are not allowed for pieces of information to be obtained. Thus, even pieces of unnecessary information are collected. The number of access terminals coupled to the transport nodes is larger than the number of edge nodes or transport nodes. As a result, collection of pieces of uniform statistical information or alarm information leads to bandwidth consumption of an access line and an increase of loads on the edge node for collecting pieces of information from the access terminal.

This invention has been made in view of the above-mentioned problems with the conventional art.

A first object of this invention is to specify a data discarding point and a discarding cause by obtaining statistical information from an access terminal coupled to a transport node. Even in a service in which a bandwidth is not guaranteed, collected pieces of statistical information can be used to specify a cause of congestion of a network.

A second object of this invention is to specify the data discarding point and the discarding cause by obtaining, in addition to the statistical information, alarm information from the access terminal coupled to the transport node.

A third object of this invention is to reduce a traffic amount for collecting pieces of information from the access terminal and loads on an edge node for collecting pieces of information by selecting statistical information or alarm information to be obtained according to a type of the access terminal and an installing place.

A fourth object of this invention is to reduce loads on the entire network by controlling, after the discarding occurring point is specified, an outgoing transmission bandwidth of the access terminal for housing a user terminal which causes the discarding.

To achieve the first object, there is provided an access terminal for housing a user terminal and an edge node for interconnecting the access network and the transport network. The access terminal measures pieces of statistical information including a traffic amount in the access terminal and notify the edge node of the measured pieces of statistical information; and the edge node collects the pieces of statistical information notified by the access terminal.

To achieve the second object, there is provided means for detecting, by the access terminal, at least one of a device alarm and a communication alarm of the access terminal, notifying, by the access terminal, the edge node of the at least one of the detected device alarm and the detected communication alarm, and collecting, by the edge node, the at least one of the device alarm and the communication alarm notified of from the access terminal.

To achieve the third object, there is provided means for transmitting, by the edge node, a control frame for instructing at least one of statistical information and alarm information to be obtained by the access terminal, collecting, by the access terminal, after having received the control frame, only pieces designated by the control frame and included in the at least one of the statistical information and the alarm information, periodically transmitting, by the access terminal, the only designated pieces included in the at least one of the statistical information and the alarm information to the edge node, and recovering, by the edge node, the at least one of the statistical information and the alarm information obtained from the access terminal to hold data by an access terminal unit.

To achieve the fourth object, there is provided means for comparing, by the edge node, the statistical information obtained from the access terminal with statistical information of each access terminal flowing into the edge node for each access terminal to compare an amount of data transmitted from the access terminal to the access network with an amount of data of each access terminal received by the edge node, and transmitting, by the edge node, control data for suppressing the amount of data transmitted from the access terminal to the access network if the amount of data received by the edge node is smaller than the amount of data transmitted from the access terminal to the access network, thereby reducing loads on the access network.

This invention enables the edge node to collect the at least one of the statistical information and the alarm information measured by the access terminal.

BRIEF DESCRIPTION OF THE DRAWINGS

The present invention can be appreciated by the description which follows in conjunction with the following figures, wherein:

FIG. 9 is a diagram illustrating a configuration of a statistics/alarm table stored in the access terminal according to the first embodiment of this invention;

DETAILED DESCRIPTION OF THE PREFERRED EMBODIMENTS

Referring to the accompanying drawings, the embodiments of this invention will be described below.

First Embodiment

Figure 1:
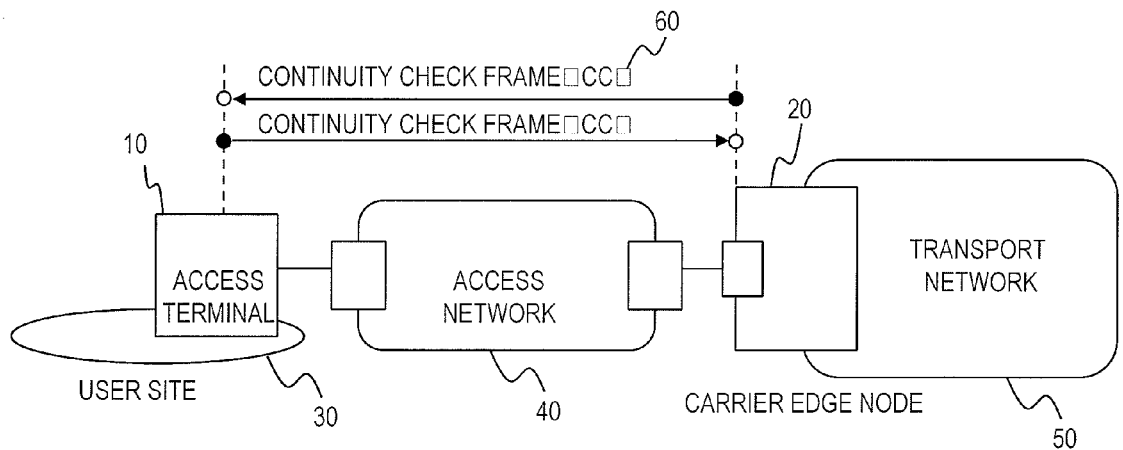
FIG. 1 is a diagram illustrating an example of a carrier access network configuration according to a first embodiment of this invention.

FIG. 1 illustrates an example of a carrier access network configuration according to a first embodiment of this invention.

The carrier access network of the first embodiment of this invention includes a user site 30, an access network 40, and a transport network 50. The user site 30 and the access network 40 are interconnected via an access terminal 10. The access network 40 and the transport network 50 are interconnected via a carrier edge node 20.

The access network 40 is a network for interconnecting the user site 30 and the transport network 50. Specifically, the access network 40 is FTTH, ADSL, or CATV. The transport network 50 is coupled to another network (not shown).

The access terminal 10 is coupled to the user site 30 and the access network 40. According to the first embodiment of this invention, the access terminal 10 collects pieces of statistical information containing an amount of data transmitted from the user site 30 to the access network 40 and an amount of data transmitted from the access network 40, and pieces of alarm information such as device failure information or communication alarm information detected by itself. A configuration of the access terminal 10 will be described below referring to FIG. 8.

The carrier edge node 20 is coupled to the access network 40 and the transport network 50. The carrier edge node 20 of the first embodiment of this invention can measure an amount of data transmitted to/received from the transport network 50. The carrier edge node 20 can obtain the pieces of statistical information and alarm information collected by the access terminal 10, and compare the data amount measured by the carrier edge node 20 with a data amount collected from the access terminal 10 to calculate the amount of discarded data. A configuration of the carrier edge node 20 will be described below referring to FIG. 4.

For means for collecting the pieces of statistical information and alarm information from the access terminal 10, for example, an Ethernet OAM function of international recommendation "Y.1731" standardized by ITU-T can be used.

Because of standardization as a LAN technology, the Ethernet has lacked certain functions for use in a wide-area network. Specifically, the Ethernet has lacked a maintenance management function of investigating a status of a remote LAN switch or cutting off a line failure in the midway. Thus, the maintenance management function of the Ethernet has been standardized as "Y.1731".

In Ethernet OAM, a continuity check (CC) function is defined as a function of checking continuity between arbitrary points. The CC function is a function of checking a normal status of a communication path by periodically transmitting/receiving a CC frame 60 between end communication devices of a continuity check section. This CC frame 60 can contain the pieces of statistical information or alarm information collected by the access terminal 10 to be transmitted to the carrier edge node 20. The CC frame will be described below in detail referring to FIGS. 2, 6 and 10. When no CC frame is used, the access terminal 10 may notify the carrier edge node 20 of the statistical information or the alarm information by using a VSM frame similarly defined in the Ethernet OAM. The VSM frame is a frame which permits a device provider to freely define a payload with Y.1731.

Figure 3:
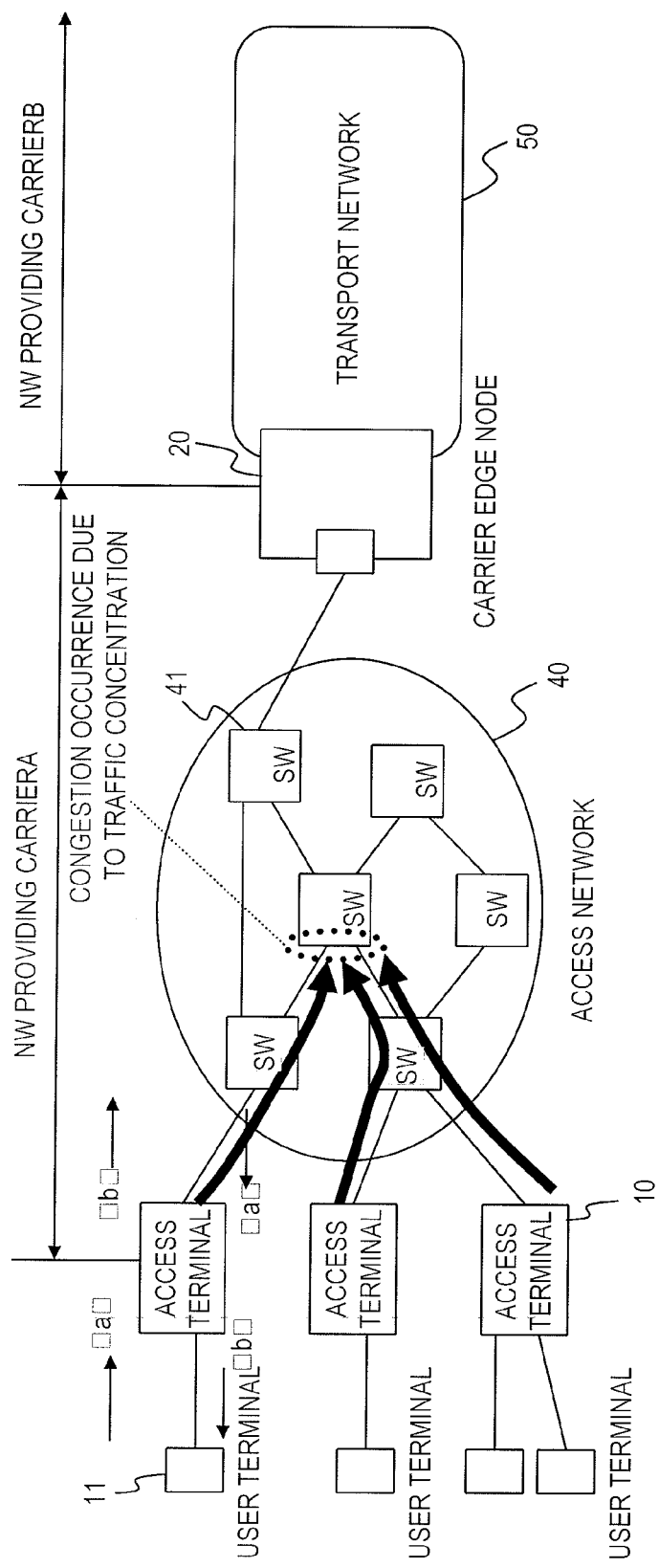
FIG. 3 is a diagram illustrating an example of a configuration of an access network according to the first embodiment of this invention.

FIG. 3 illustrates an example of a configuration of the access network 40 according to the first embodiment of this invention.

The access network 40 includes a plurality of switches (SW) 41. The SW 41 analyzes a received frame to transmit the frame to a designated communication partner.

In the network of the first embodiment of this invention, a provider (NW providing carrier A) of the access network 40 and a provider (NW providing carrier B) of the transport network 50 are different from each other. Even if the same provider provides the access network 40 and the transport network 50, when services are provided in different departments, the same holds true.

In the network of the first embodiment of this invention, when guarantee type dedicated line services are provided, a contract of a guaranteed bandwidth is made with a user. In this case, if no guaranteed bandwidth can be secured, a penalty may have to be paid for due to violation of the contract.

A cause for nonsecuring of a guaranteed bandwidth may be discarding of transferred data which occurs because data congestion in the network path leads to buffer overflowing, or discarding of data caused by a device failure. However, when the providers of the access network 40 and the transport network 50 are different, to clarify a locus of responsibility, a point of data discarding has to be accurately specified.

Referring to FIG. 3, there are largely three points where data may be discarded.

A first point may be a case where data is discarded in the access terminal 10. A cause for data discarding at the first point may be, for example, transmission of data with its amount exceeding a contracted bandwidth by the user, or a failure of the access terminal 10. If the data with its amount exceeding the contracted bandwidth is transmitted by the user, responsibility is on the user himself/herself. On the other hand, if data is discarded due to a failure of the access terminal 10, responsibility is on the provider of the access terminal 10.

A second point may be a case where data is discarded in the access network 40. A cause for discarding of data in the access network 40 may be, as illustrated in FIG. 3, the occurrence of congestion due to traffic concentration on a certain SW 41. In this case, responsibility is on the provider of the access network.

Lastly, a third point may be a case where data is discarded in the transport network 50. When data is discarded in the transport network 50, responsibility is on the provider of the transport network.

To specify data discarding occurring at the three points, the access terminal 10 has to collect an amount of data input from a user terminal 11 to the access terminal 10 and an output data amount, an amount of data input from the access terminal 10 to the access network 40 and an output data amount, and alarm information detected by the access terminal 10. The carrier edge node 20 has to measure an amount of data input from the access network and an output data amount, and an amount of data output to the transport network and an input data amount.

In the case of housing a plurality of user terminals, the data amounts have to be measured by user flow units.

The carrier edge node 20 collects the pieces of statistical information and alarm information collected by the access terminal 10 to compare the pieces of statistical information and alarm information with the data amounts measured by the carrier edge node 20. The carrier edge node 20 can accordingly specify which of the access terminal 10, the access network 40, and the transport network 50 is a data discarding place.

Figure 4:
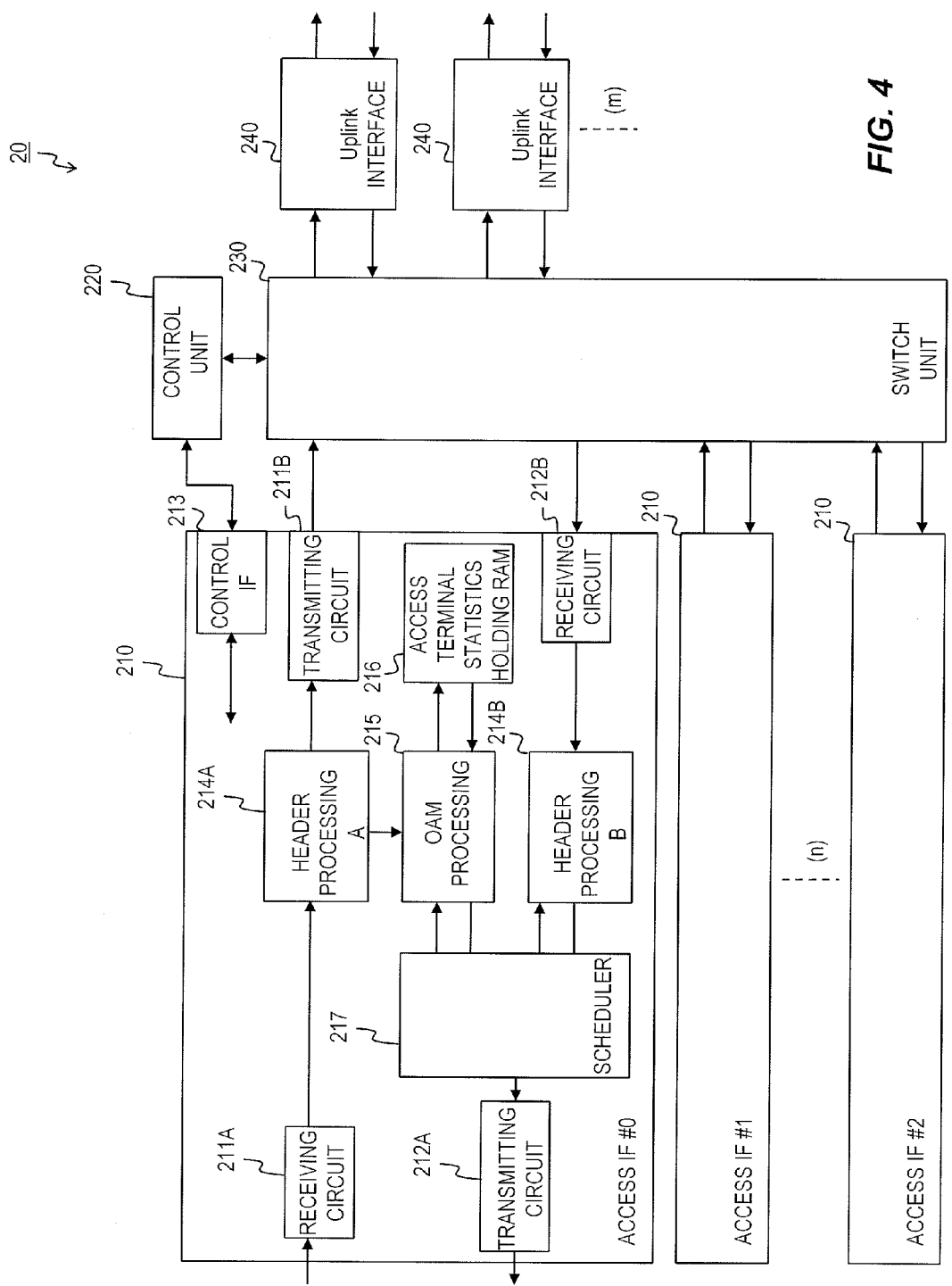
FIG. 4 is a block diagram illustrating a configuration of a carrier edge node according to the first embodiment of this invention.

FIG. 4 is a block diagram illustrating the configuration of the carrier edge node 20 according to the first embodiment of this invention.

The carrier edge node 20 includes a control unit 220, a switch unit 230, an uplink interface 240, and an access interface (IF) 210. The carrier edge node 20 includes a plurality of access IFs 210. The control unit 220, the switch unit 230, the uplink interface 240, and the access IF 210 are coupled to one another.

The control unit 220 sets path information in the access IF 210, the uplink interface 240, and the switch unit 230, and collects pieces of statistical information from the access IF 210 and the uplink interface 240. The control unit 220 analyzes the pieces of statistical information and alarm information collected from the access terminal 10.

The switch unit 230 specifies a data transfer destination to supply the transferred data to the appropriate access IF 210 or uplink interface 240.

The uplink interface 240 is an interface for connection to the transport network 50.

The access IF 210 is an interface for connection to the access network 40. The access IF 210 has a function of collecting and storing the pieces of statistical information and alarm information measured by the access terminal 10.

The access IF 210 includes a receiving circuit 211A, a transmitting circuit 212A, a receiving circuit 211B, a transmitting circuit 212B, a control IF 213, a header processing unit A 214A, a header processing unit B 214B, an OAM processing unit 215, an access terminal statistics holding RAM 216, and a scheduler 217. The control unit 220 sets each component of the access IF 210 and collects pieces of statistical information via the control IF 213.

The control IF 213 receives a control command from the control unit 220 to transmit the control command to each component. The control IF 213 collects, according to a request from the control unit 220, pieces of setting information from the components and the pieces of obtained statistical information to transmit the setting information and the statistical information to the control unit 220.

The receiving circuit 211A receives data from the access network 40. The transmitting circuit 212A transmits data to the access network 40.

The receiving circuit 212B receives data from the switch unit 230. The transmitting circuit 211B transmits data to the switch unit 230.

Each of the header processing unit A 214A and the header processing unit B 214B analyzes, after reception of a frame, a header part of the frame, analyzes a received data type, and specifies a transmission source access terminal 10 of the received frame. Each of the header processing unit A 214A and the header processing unit B 214B has a function of counting the number of received frames or the number of bytes for each user or each access terminal 10. As an example, the header processing unit A 214A will be described.

Having received a frame, the header processing unit A 214A extracts header information. The header processing unit A 214A specifies an access terminal 10 which has transmitted the frame from the extracted header information. The header processing unit A 214A analyzes a type of the frame, and transfers the frame to the OAM processing unit 215 if the received frame is an OAM frame. If the received frame is a data frame, the header processing unit A 214A counts the number of received frames or the number of received bytes which are pieces of statistical information for each access terminal 10, and transfers the frame to the transmitting circuit 211B.

Having received the OAM frame from the header processing unit A 214A, the OAM processing unit 215 analyzes a type of the OAM frame to execute OAM termination processing for each type. The OAM processing unit 215 has a function of inserting an OAM frame from the carrier edge node 20 into the access terminal 10.

Having received the OAM frame from the header processing unit A 214A, the OAM processing unit 215 analyzes a type of the OAM frame. If the OAM frame received from the header processing unit A 214A is the CC frame 60, the OAM processing unit 215 executes processing for continuity check.

According to the first embodiment of this invention, if the CC frame 60 contains statistical information (CC payload information) measured by the access terminal 10, the statistical information is obtained from the frame, and the pieces of statistical information and alarm information are stored in the access terminal statistics holding RAM 216 for each access terminal 10.

If pieces of statistical information and alarm information are collected from the access terminal 10 by using not the CC frame 60 but the VSM frame, after reception of the VSM frame from the header processing unit A 214A, the pieces of statistical information and alarm information are obtained from a payload, and the pieces of statistical information and alarm information are stored in the access terminal statistics holding RAM 216 for each access terminal 10.

The OAM processing unit 215 has a function of periodically transmitting the CC frame 60 to the access terminal 10, or transmitting a VSM frame 70 for notifying the access terminal 10 of an instruction to start statistics acquisition or alarm detection.

The access terminal statistics holding RAM 216 stores statistical information and alarm information measured by the access terminal 10.

Figure 5:
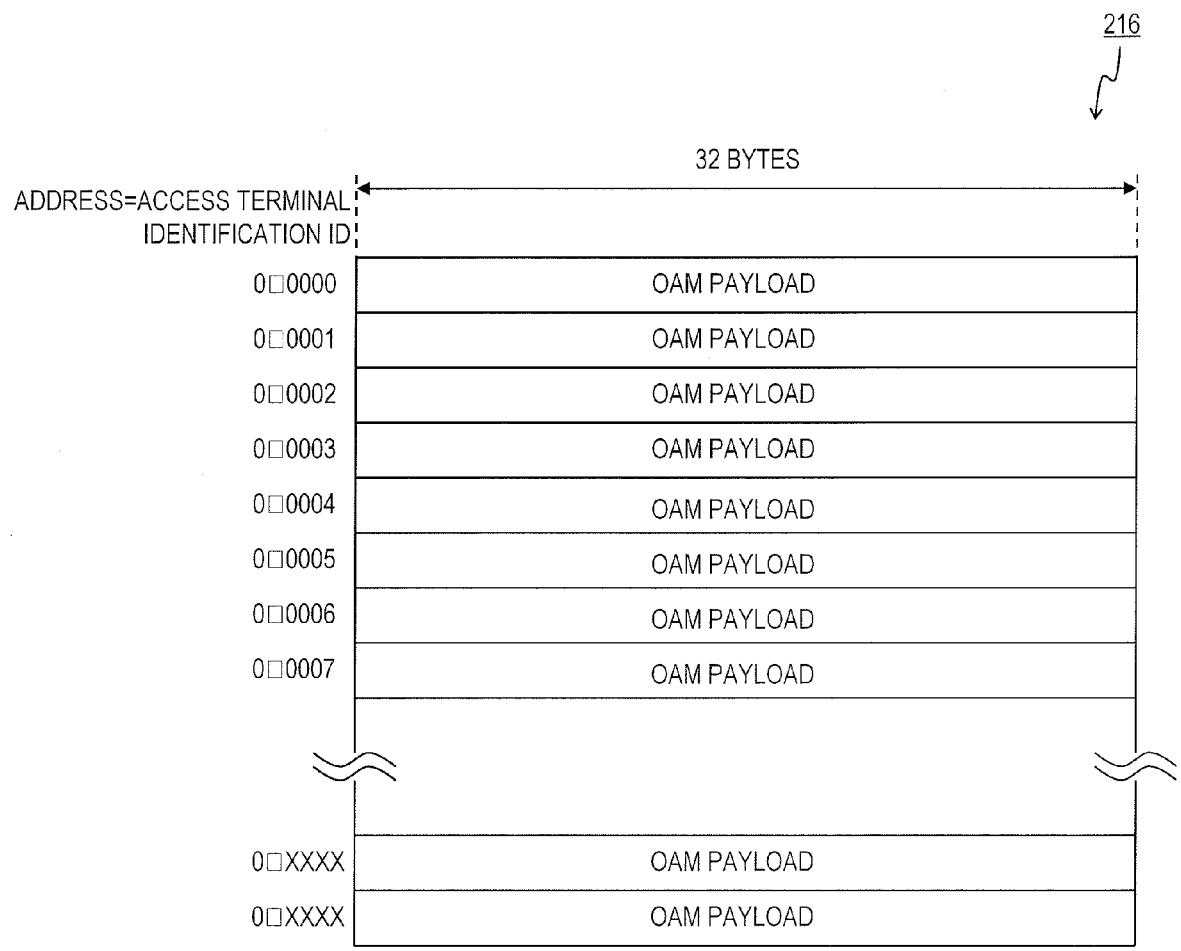
FIG. 5 is a diagram illustrating an example of an access terminal statistics holding RAM according to the first embodiment of this invention.

FIG. 5 illustrates an example of the access terminal statistics holding RAM 216 according to the first embodiment of this invention.

The access terminal statistics holding RAM 216 is a RAM for storing statistical/alarm information of an access terminal for each address. A byte width of the RAM is 32 bytes as an example. However, a byte width varies depending on device mounting, and thus the width is not limited to this.

A memory address of the access terminal statistics holding RAM 216 may correspond to, for example, an identifier (identification ID) for identifying an access terminal. The access terminal identification ID is an ID used in the device for specifying a MAC address or VID of a VLAN tag of a transmission source access terminal.

Having obtained the statistical information and the alarm information obtained by the access terminal 10 from the CC frame or the VSM frame, the OAM processing unit 215 writes the obtained information in a RAM address matching the access terminal identification ID for specifying the transmission source access terminal 10 of the OAM frame.

The statistical information or alarm information written in the access terminal statistics holding RAM 216 is different from one access terminal 10 to another.

A network administrator can periodically obtain the statistical information and alarm information for each Ethernet OAM device from the access terminal statistics holding RAM 216 of each access IF 210 via the control unit 220.

The scheduler 217 controls an order of supplying data to be transmitted to the access network 40 to the transmitting circuit 212A.

Figure 8:
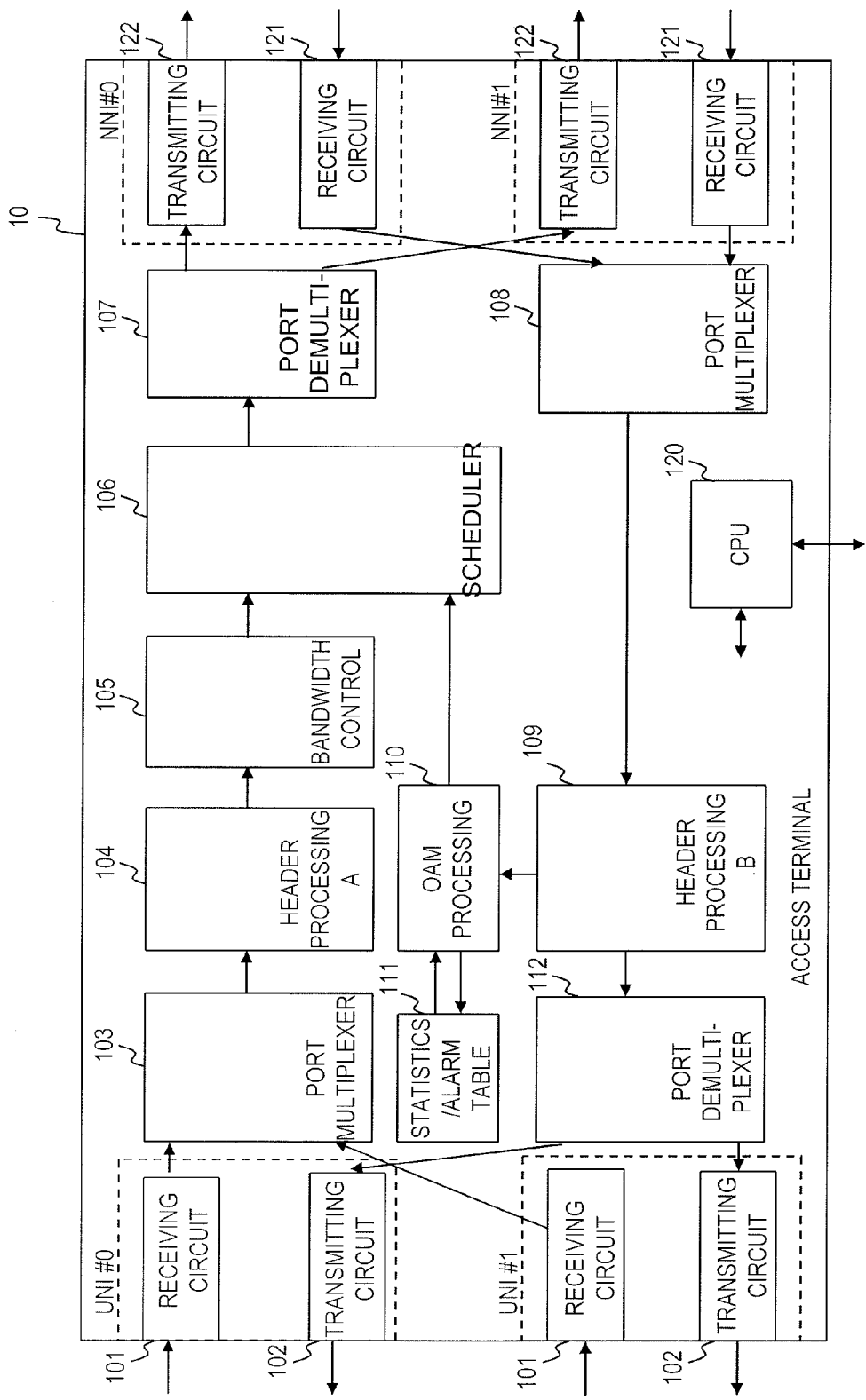
FIG. 8 is a block diagram illustrating a configuration of the access terminal according to the first embodiment of this invention.

FIG. 8 is a block diagram illustrating the configuration of the access terminal 10 according to the first embodiment of this invention.

The access terminal 10 includes a receiving circuit 101, a transmitting circuit 102, a port multiplexer 103, a header processing unit A 104, a bandwidth control unit 105, a scheduler 106, a port demultiplexer 107, a port multiplexer 108, a header processing unit B 109, an OAM processing unit 110, a statistics/alarm table 111, a port demultiplexer 112, a CPU 120, a receiving circuit 121, and a transmitting circuit 122.

The receiving circuit 101 and the transmitting circuit 102 are coupled to the user terminal 11 of the user site 30. A transmission/reception port on the user site 30 side is defined as a user network interface (UNI). The access terminal of FIG. 8 includes two UNIs. However, the number of UNIs may be one, three or more.

The receiving circuit 101 receives data transmitted from the user terminal 11. The transmitting circuit 102 transmits data received from the access network 40 to the user terminal 11.

The port multiplexer 103 multiplexes frames received from a plurality of receiving circuits 101. The header processing unit A 104 obtains header information of the received frames, and executes processing based on the header information. The bandwidth control unit 105 controls a bandwidth as necessary, for example, when guarantee type services are provided.

The scheduler 106 executes arbitration processing of reading a frame of one of the bandwidth control unit 105 and the OAM processing unit 110.

The port demultiplexer 107 demultiplexes the frame received from the scheduler 106 to NNI #0 or NNI #1. For the frame demultiplexing, for example, destination information of a frame header may preferably be used.

The receiving circuit 121 receives the data transmitted from the access network 40. The transmitting circuit 122 transmits the data received from the user site 30 to the access network 40. The receiving circuit 121 and the transmitting circuit 122 are used for connection with the access network 40, constituting a network network interface (NNI). The access terminal of FIG. 8 includes two NNIs. However, the number of NNIs may be one, three or more.

The port multiplexer 108 multiplexes frames received from a plurality of receiving circuits 121.

The header processing unit B 109 analyzes the received frames to specify a flow. The header processing unit B 109 judges which of user data and OAM frames the received frames are. If the received frames are user data, the header processing unit B 109 counts up a frame byte length and the number of received frames to obtain statistical information when necessary. After the statistical information has been obtained, the header processing unit B 109 transfers the user data to the port demultiplexer 112.

If each of the received frames is an OAM frame such as the CC frame 60 or the VSM frame 70, the header processing unit B 109 transfers the OAM frame to the OAM processing unit 110.

The port demultiplexer 112 demultiplexes the frame received from the header processing unit B 109 to UNI #0 or UNI #1. For the frame demultiplexing, for example, destination information of a frame header may preferably be used.

Having obtained an Ethernet OAM frame from the header processing unit B 109, the OAM processing unit 110 executes termination processing for the Ethernet OAM frame. For example, when the received Ethernet OAM frame is the CC frame or the VSM frame, the OAM processing unit 110 obtains a collected information code for instructing collection of pieces of specific statistical information or monitoring of alarm information from a frame payload to notify the CPU 120 of the collected information code.

The OAM processing unit 110 generates the CC frame or the VSM frame to supply the frame to the scheduler 106.

The CPU 120 sets setting information necessary for an operation of each component at a designated position, detects alarm information, and manages statistical information. Having obtained the collected information code from the OAM processing unit 110, the CPU 120 analyzes the collected information code, and instructs each functional block to start collection of pieces of designated statistical information or monitor alarm information.

Referring to FIGS. 2, 6, 7, 10, 18 and 19, examples of an operation of notifying the access terminal 10 of statistical information collection or alarm information monitoring from the carrier edge node 20 and an operation of notifying the carrier edge node 20 of statistical information or alarm information from the access terminal 10 in the first embodiment of this invention will be described.

Figure 19:
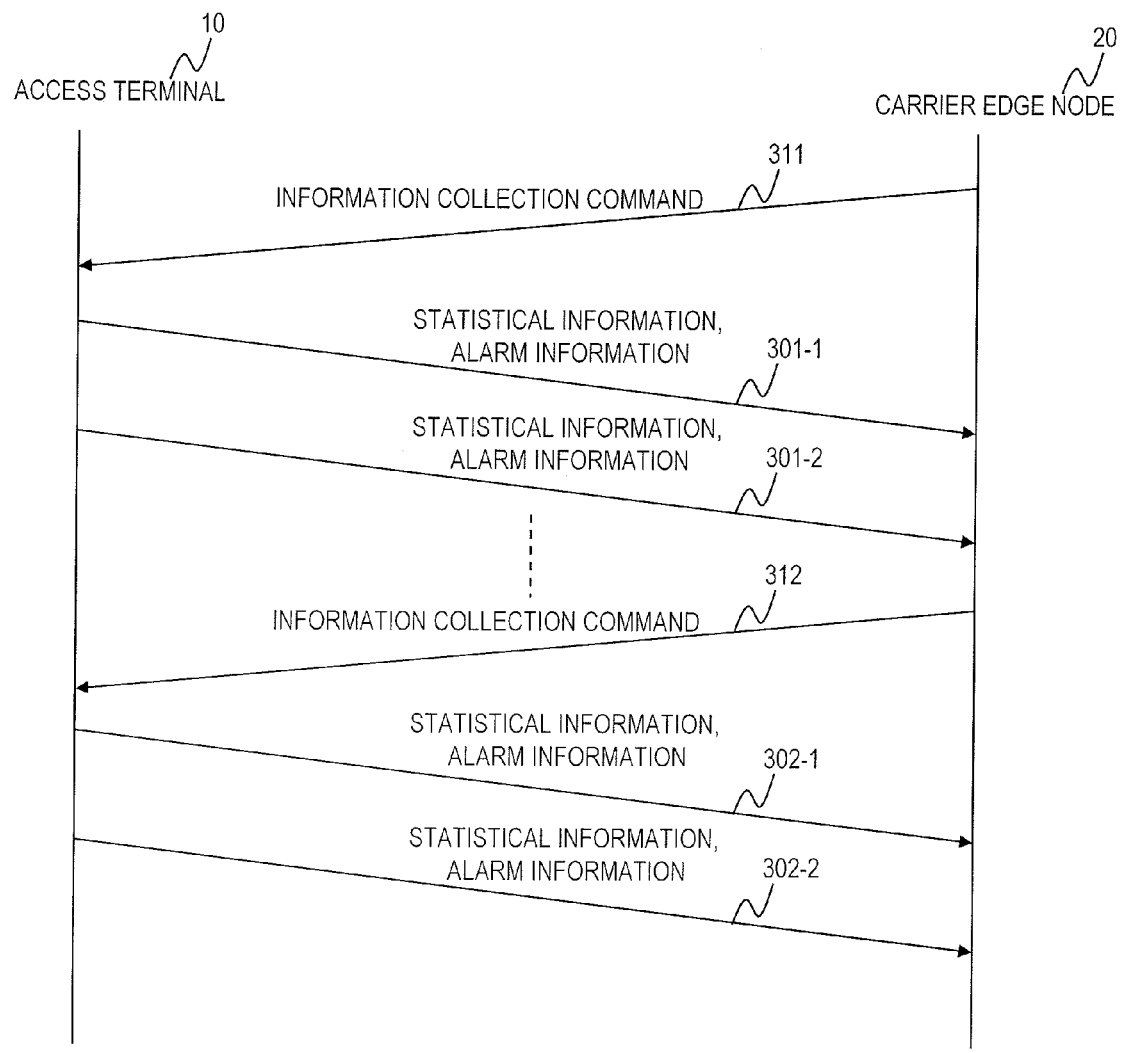
FIG. 19 is a sequential diagram where the carrier edge node instructs the access terminal to start statistical information collection or alarm information monitoring, and the access terminal having received the instruction transmits statistical information or alarm information to the carrier edge node according to the first embodiment of this invention.

FIG. 19 is a sequential diagram of the first embodiment of this invention, where the carrier edge node 20 instructs the access terminal 10 to start statistical information collection or alarm information monitoring, and the access terminal 10 having received the instruction periodically transmits statistical information or alarm information to the carrier edge node 20.

When wishing to instruct the access terminal 10 to start new statistical information collection or alarm information monitoring, the carrier edge node 20 notifies the access terminal 10 of an information collection command 311.

A specific content of statistical information instructed to be collected or alarm information instructed to be monitored by the information collection command 311 is, for example, "statistics of number of input frames of UNI port", "statistics of number of output frames of NNI port", "number of input frames by housed user unit", "monitoring of hardware failure alarm", or "monitoring of continuity check result between access terminals in communication".

Figure 2:
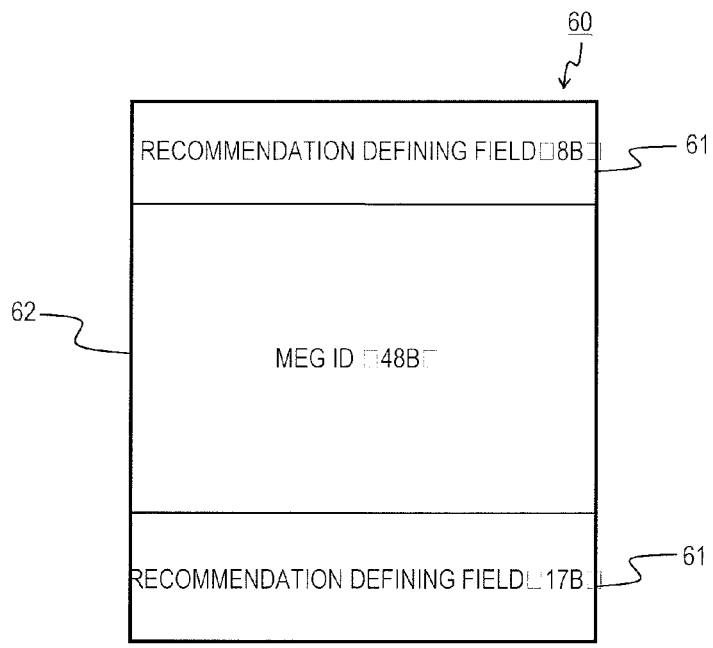
FIG. 2 is a diagram illustrating a format of a CC frame of Y.1731 according to a first embodiment of this invention.
Figures 6, 7:
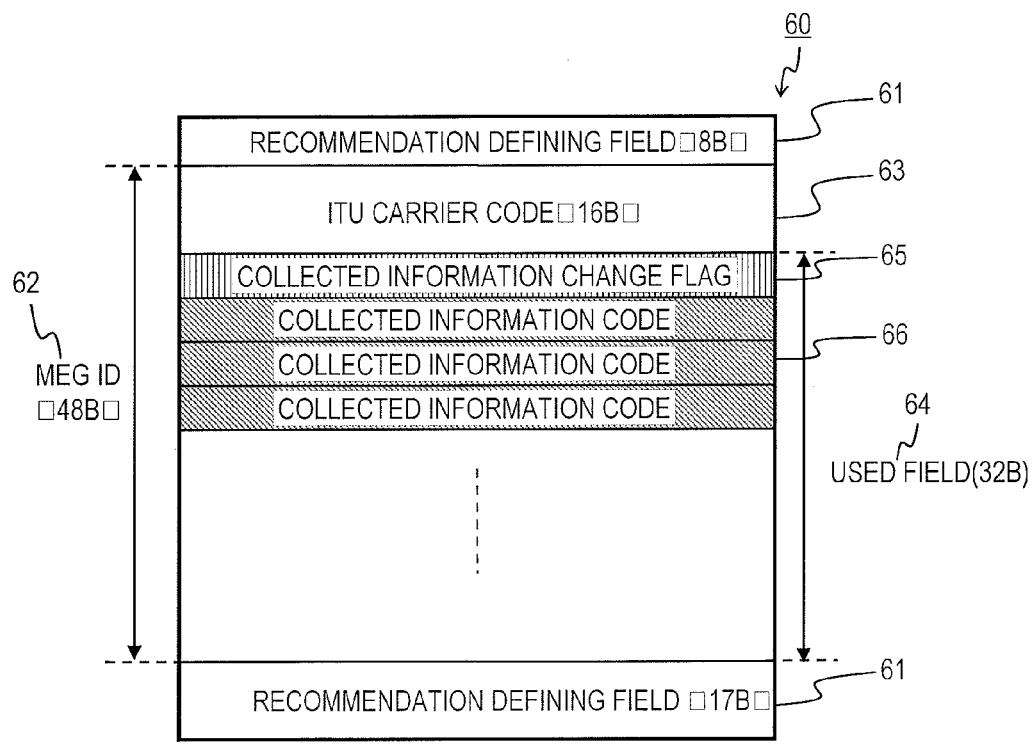
FIG. 6 is a diagram illustrating an example of a configuration of the CC frame transmitted from the carrier edge node to the access terminal according to the first embodiment of this invention.
FIG. 7 is a diagram illustrating an example of a configuration of a VSM frame transmitted from the carrier edge node to the access terminal according to the first embodiment of this invention.

The information collection command 311 may be stored in the CC frame 60 or the VSM frame periodically transmitted from the carrier edge node 20, and the access terminal 10 may be notified of the information collection command 311 from the carrier edge node 20. Referring to FIGS. 2, 6 and 7, the CC frame or the VSM frame storing the information collection command 311 will be described below.

Having received the information collection command 311, the access terminal 10 starts statistical information collection or alarm information monitoring instructed by the information collection command 311.

Figure 10:
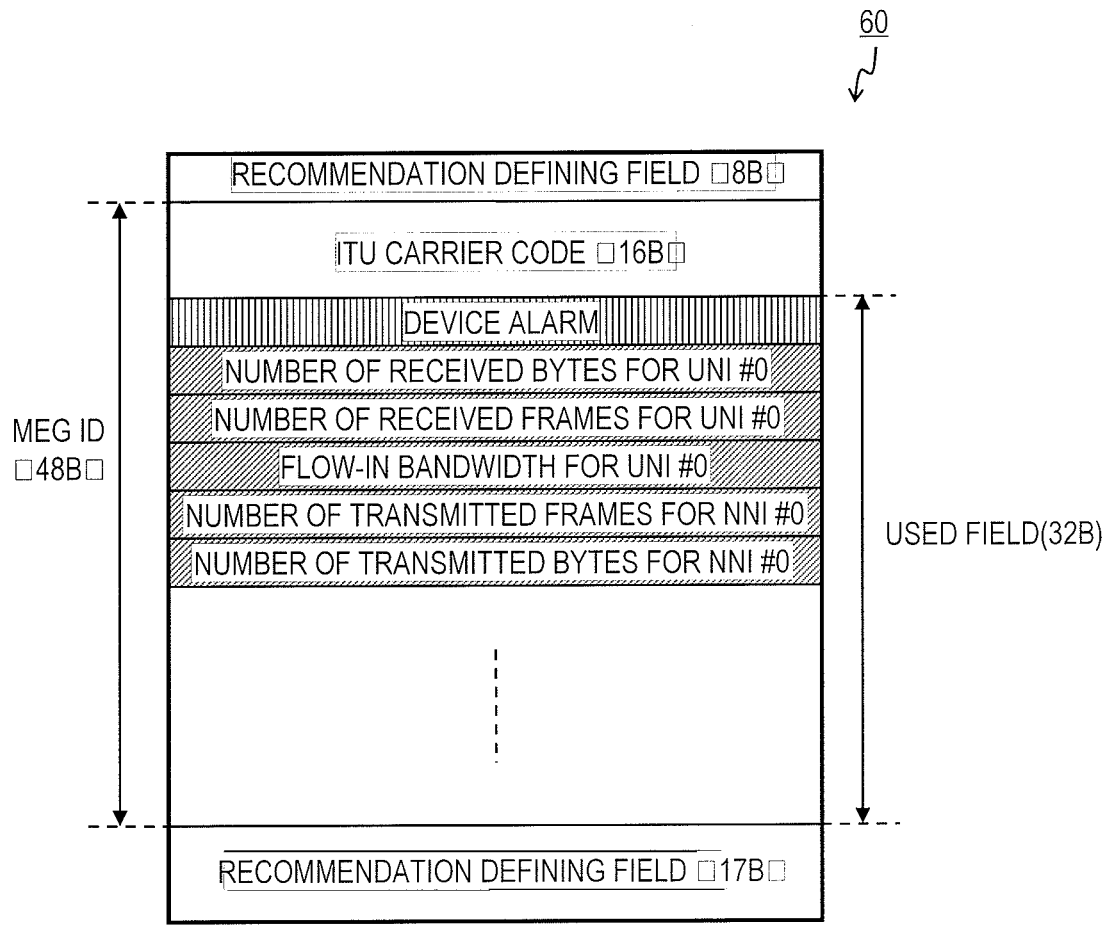
FIG. 10 is a diagram illustrating the CC frame after the OAM processing unit of the access terminal has stored information requested by the carrier edge node according to the first embodiment of this invention.
Figure 18:
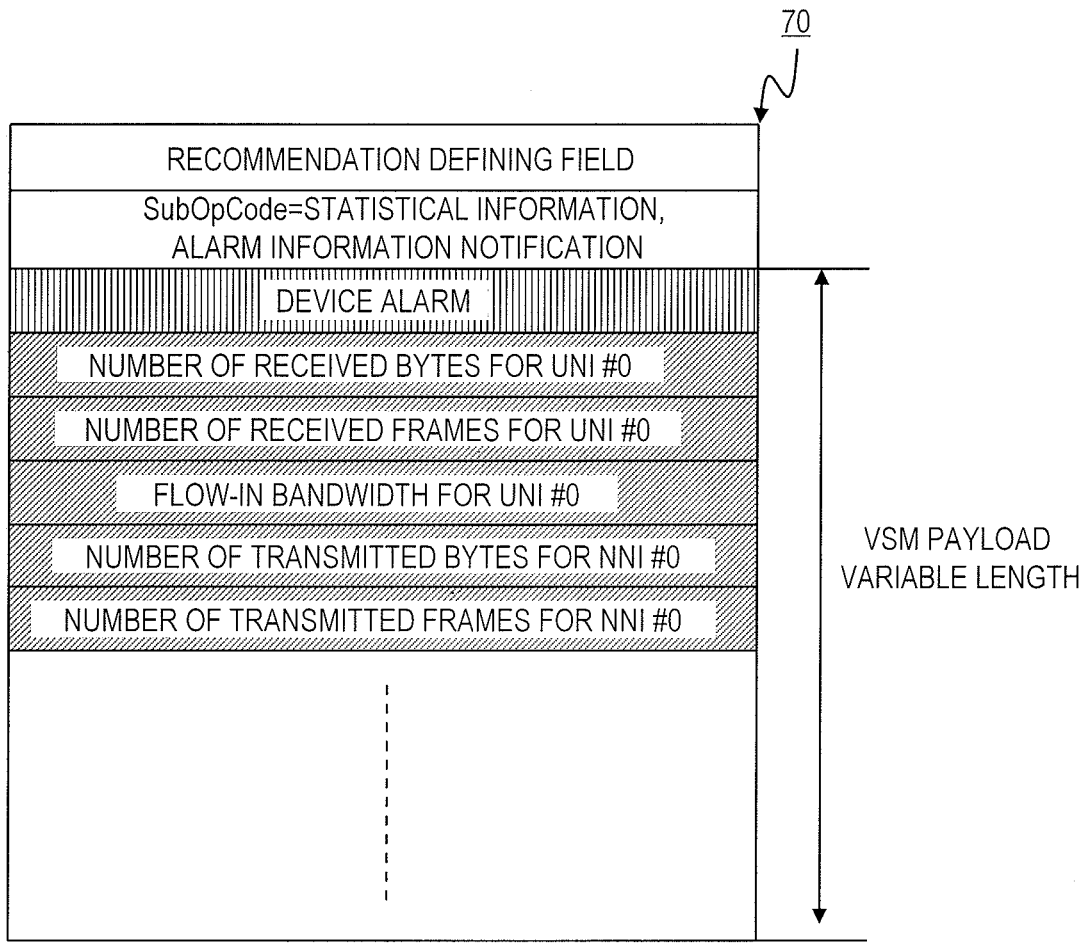
FIG. 18 is a diagram illustrating the VSM frame after the OAM processing unit of the access terminal has stored information requested by the carrier edge node according to the first embodiment of this invention.

The access terminal 10 periodically notifies the carrier edge node 20 of the instructed statistical information or alarm information 301-$n$ (n: 1, 2, 3, . . . ). The statistical information or alarm information 301-$n$ notified by the access terminal 10 may be stored in the CC frame 60 or VSM frame 70 periodically transmitted from the access terminal 10 to be notified to the carrier edge node 20 from the access terminal 10. Referring to FIGS. 10 and 18, the CC frame or VSM frame storing the statistical information or alarm information 301-$n$ will be described below.

To change the statistical information or alarm information collected from the access terminal 10, the carrier edge node 20 notifies an information collection command 312. Having received the new information collection command 312, the access terminal 10 changes statistical information or alarm information 302-$n$ to be collected, and periodically notifies the carrier edge node 20 of the change.

Referring to FIGS. 2, 6 and 7, the CC frame or VSM frame storing the information collection command 311 will be described.

Referring to FIGS. 2 and 6, a format of the CC frame when the information collection command 311 is stored in the CC frame will be described.

FIG. 2 illustrates a format of the CC frame 60 of Y.1731. The CC frame 60 defined by Y.1731 includes a recommendation defining field 61 and an MEG ID 62.

The recommendation defining field 61 stores information defined in "Y.1731". The recommendation defining fields 61 are disposed at a head and tail of a frame. A size of the recommendation defining field 61 disposed at the head of the frame is 8 bytes. The recommendation defining field 61 disposed at the head of the frame enables recognition of the CC frame. A size of the recommendation defining field 61 disposed at the tail of the frame is 17 bytes.

The MEG ID 62 standardized by Y.1731 is an identifier for identifying attributes of a management target of Ethernet OAM. According to the standard, a 48-byte field is prepared. High 16 bytes thereof are predetermined to be used as ITU carrier codes. However, low 32 bytes are "unused" according to the standard.

Thus, in the example of collecting pieces of statistical information or alarm information from the access terminal 10 by using the CC frame, low 32 bytes of the MEG ID 62 are used.

FIG. 6 illustrates a configuration example of the CC frame 60 for notifying the access terminal 10 of the information collection command from the carrier edge node 20 according to the first embodiment of this invention.

As illustrated in FIG. 2, the format of the CC frame 60 includes the recommendation defining field 61 and the MEG ID 62.

In the MEG ID 62, only a 16-byte ITU carrier code 63 for identifying a network provider is defined. A remaining 32-byte field of the MEG ID 62 is an unused area. Thus, in the first embodiment of this invention, the unused 32-byte area is used as a collected information code storage area 64 for designating pieces of alarm/statistical information to be collected by the access terminal. The 32-byte collected information code storage area may preferably include, for example, a collected information change flag 65 and a collected information code 66.

The collected information change flag 65 stores a value of "1" or "0", where "1" indicates a start of collection of pieces of new statistical or alarm information, and "0" indicates continuous collection of last instructed contents.

The collected information change flag 65 changes the value from 0 to 1 when contents of pieces of statistical or alarm information to be collected by the access terminal 10 are changed.

The collected information code 66 is a field used for notifying statistical or alarm information to be obtained by the access terminal 10. This field stores, for example, a code indicating a type of the obtained statistical information or a code indicating a monitored device alarm or a monitored communication alarm.

Figure 12A:
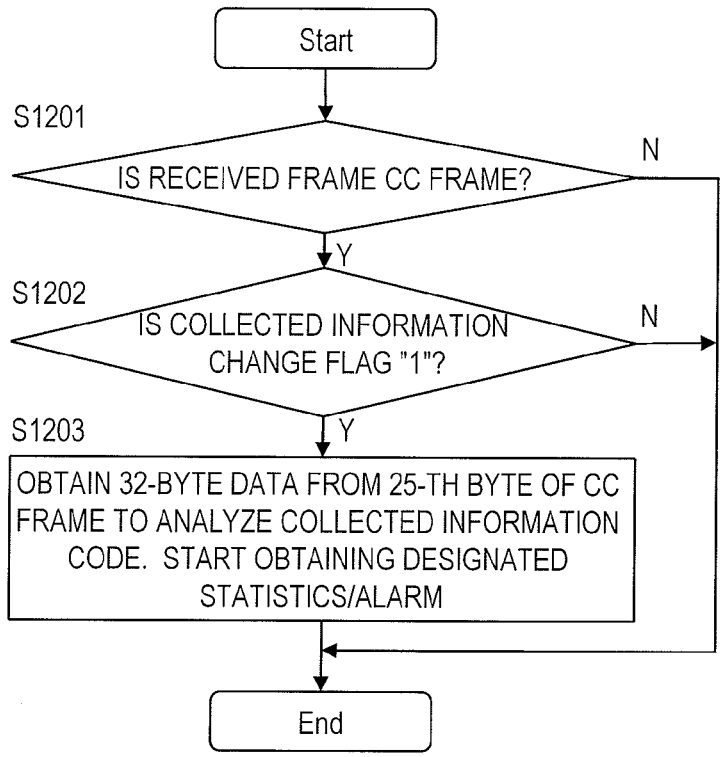
FIG. 12A is a flowchart illustrating a procedure of processing executed by the OAM processing unit when the access terminal receives the CC frame according to the first embodiment of this invention.

FIG. 12A is a flowchart illustrating a procedure of processing executed by the OAM processing unit 110 when the access terminal 10 of the first embodiment of this invention receives the CC frame 60 storing the information collection command 311.

Having received the OAM frame, the OAM processing unit 110 of the access terminal 10 judges whether or not the received OAM frame is the CC frame 60 (S1201). If the received frame is not the CC frame 60 (result of S1201 is "N"), the processing is finished.

If the received frame is the CC frame 60 (result of S1201 is "Y"), the OAM processing unit 110 of the access terminal 10 judges whether or not a value of the collected information change flag 65 contained in the CC frame 60 is "1" (S1202). If the value of the collected information change flag 65 is not "1", in other words, if the value of the collected information change flag 65 is "0" (result of S1202 is "N"), the processing is finished to continue the last instructed information collection.

If the value of the collected information change flag 65 is "1" (result of S1202 is "Y"), the OAM processing unit 110 of the access terminal 10 obtains a collected information code from the CC frame 60. Referring to FIG. 6, the collected information change flag 65 is stored in the 25-th byte of the CC frame 60, and the collected information code 66 is stored in 31-byte data from the 26-th byte.

The OAM processing unit 110 of the access terminal 10 notifies the CPU 120 of the obtained collected information code 66. The CPU 120 analyzes the collected information code 66 to start acquisition of designated statistical information or alarm information (S1203).

FIG. 7 illustrates a format of the VSM frame when the VSM frame of the first embodiment of this invention stores the information collection command 311. The VSM frame 70 may be used for notifying the access terminal 10 of the information collection command from the carrier edge node 20 of the first embodiment of this invention.

The VSM frame 70 includes a recommendation defining field 71, SubOpCode 72, and a collected information code 73.

The recommendation defining field 71 stores information indicating a VSM frame. A size of the recommendation defining field 71 is 8 bytes. The SubOpCode 72 is an arbitrary code indicating that the VSM frame is an information collection command for requesting statistical or alarm information. In the first embodiment of this invention, a size of the SubOpCode 72 is 1 byte. The collected information code 73 is similar to the collected information code 66 contained in the CC frame 60.

Figure 12B:
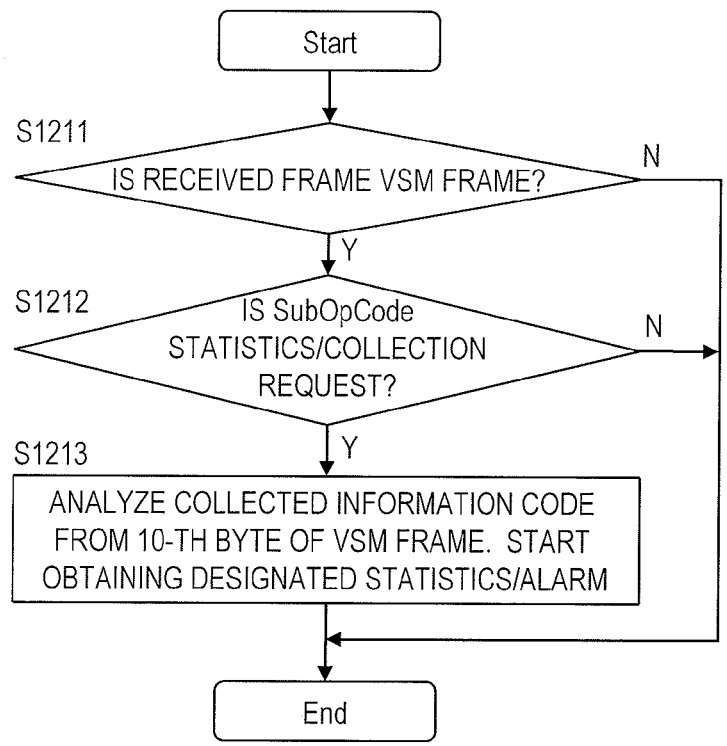
FIG. 12B is a flowchart illustrating a procedure of processing executed by the OAM processing unit when the access terminal receives the VSM frame according to the first embodiment of this invention.

FIG. 12B is a flowchart illustrating a procedure of processing executed by the OAM processing unit 110 when the access terminal 10 of the first embodiment of this invention receives the VSM frame 70.

Having received the OAM frame, the OAM processing unit 110 of the access terminal 10 judges whether or not the received OAM frame is the VSM frame 70 (S1211). If the received frame is not the VSM frame 70 (result of S1211 is "N"), the processing is finished.

If the received frame is the VSM frame 70 (result of S1211 is "Y"), the OAM processing unit 110 of the access terminal 10 judges whether or not the SubOpCode 72 contained in the VSM frame 70 is a statistics/collection request (S1212). If the SubOpCode 72 is not the statistics/collection request (result of S1212 is "N"), the processing is finished to continue the last instructed information collection.

If the SubOpCode 72 is the statistics/collection request (result of S1212 is "Y"), the OAM processing unit 110 of the access terminal 10 obtains a collected information code from the VSM frame 70. Referring to FIG. 7, the collected information code 73 is stored from a 10-th byte of the VSM frame 70.

The OAM processing unit 110 of the access terminal 10 notifies the CPU 120 of the obtained collected information code 73. The CPU 120 analyzes the collected information code 73 to start acquisition of designated statistical information or alarm information (S1213).

FIG. 9 illustrates a configuration of the statistics/alarm table 111 stored in the access terminal 10 of the first embodiment of this invention.

The statistics/alarm table 111 stores statistical information and alarm information to be transmitted to the carrier edge node 20.

Pieces of statistical information and alarm information starts to be collected by each functional block according to an instruction from the CPU 120 as described above. The CPU 120 collects pieces of statistical information and alarm information from each functional block at fixed periods to store the pieces of statistical information and alarm information in the statistics/alarm table 111. The statistical information is, for example, the number of bytes/frames transmitted/received for each port, or the number of bytes/frames transmitted/received for each housed user.

As the alarm information, there are a device alarm and a communication alarm. The device alarm contains information indicating whether or not a device failure of the access terminal 10 has occurred. The communication alarm contains information indicating a status where the access terminal 10 has checked continuity with a communication device other than the carrier edge node 20, or information of a link failure of the UNI port.

Thus, according to the first embodiment of this invention, the carrier edge node 20 can obtain alarm information for each access terminal 10 in addition to the statistical information.

Each functional block collects no information other than the pieces of statistical/alarm information designated from the carrier edge node 20. Thus, a RAM capacity necessary in the statistics/alarm table 111 is only a field for storing statistical information requested by the carrier edge node 20. As opposed to the case of a conventional communication device which collects all pieces of statistical information, a RAM capacity reduction effect can be expected.

Next, means for notifying the carrier edge node 20 of the statistical information and the alarm information from the access terminal 10 will be described.

FIG. 10 illustrates the CC frame 60 after the OAM processing unit 110 of the access terminal 10 has stored information requested by the carrier edge node 20.

According to the first embodiment of this invention, a 32-byte area subsequent to a 16-byte area secured by an ITU carrier code in the MEG ID storage field is used as a statistical/alarm information storage area. In this area, the statistical information or alarm information held in the statistics/alarm table 111 of the access terminal 10 is stored.

Figure 11A:
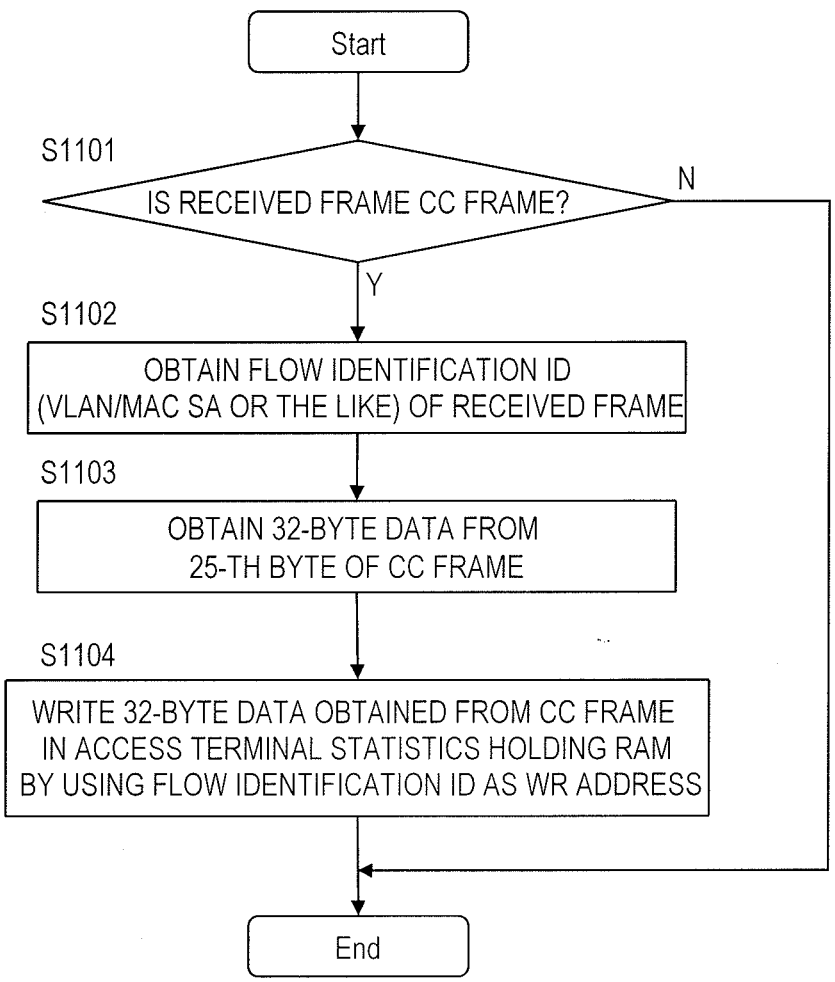
FIG. 11A is a flowchart illustrating a procedure of processing when the OAM processing unit of the carrier edge node receives the CC frame containing the pieces of statistical information or alarm information according to the first embodiment of this invention.

FIG. 11A is a flowchart illustrating a procedure of processing when the OAM processing unit 215 of the carrier edge node 20 of the first embodiment of this invention receives the CC frame 60 containing the pieces of statistical information or alarm information 301-n and 302-n.

The OAM processing unit 215 of the carrier edge node 20 first judges whether or not the received OAM frame is the CC frame 60 (S1101). If the received OAM frame is not the CC frame 60 (result of S1101 is "N"), the processing is finished to carry out normal OAM frame reception processing.

If the received frame is a CC frame 60 (result of S1101 is "Y"), the OAM processing unit 215 of the carrier edge node 20 obtains a flow identification ID from the received frame (S1102). The flow identification ID corresponds to the access terminal 10 which has transmitted the frame, and can be used as an identifier of the access terminal 10. The flow identification ID is, for example, MAC SA.

The OAM processing unit 215 of the carrier edge node 20 obtains statistical/alarm information from a payload of the received CC frame (S1103). In other words, the OAM processing unit 215 obtains the 32-byte statistical/alarm storage area stored after a recommendation defining field (8 bytes) and an ITU carrier code (16 bytes) stored at the head.

The OAM processing unit 215 of the carrier edge node 20 writes obtained 32-byte information in the access terminal statistics holding RAM based on the flow identification ID obtained in Step S1102 (S1104). As illustrated in FIG. 5, an address of the access terminal statistics holding RAM corresponds to an identification ID of the access terminal, and can be obtained from the flow identification ID.

The CC frame 60 is periodically transmitted for continuity check from the access terminal 10 to the carrier edge node 20. Thus, even when statistical information or alarm information is periodically supplied, there is still an effect of preventing consumption of a communication bandwidth of the access network.

FIG. 18 illustrates the VSM frame 70 after the OAM processing unit 110 of the access terminal 10 of the first embodiment of this invention has stored information requested by the carrier edge node 20.

According to the first embodiment of this invention, SubOpcode stores codes for defining storage of the pieces of statistical information or alarm information 301-n and 302-n in a payload.

A variable-length area subsequent to the SubOpcode is used as a statistical/alarm information storage area. In this area, the statistical information or the alarm information held in the statistics/alarm table 111 of the access terminal 10 is stored.

Figure 11B:
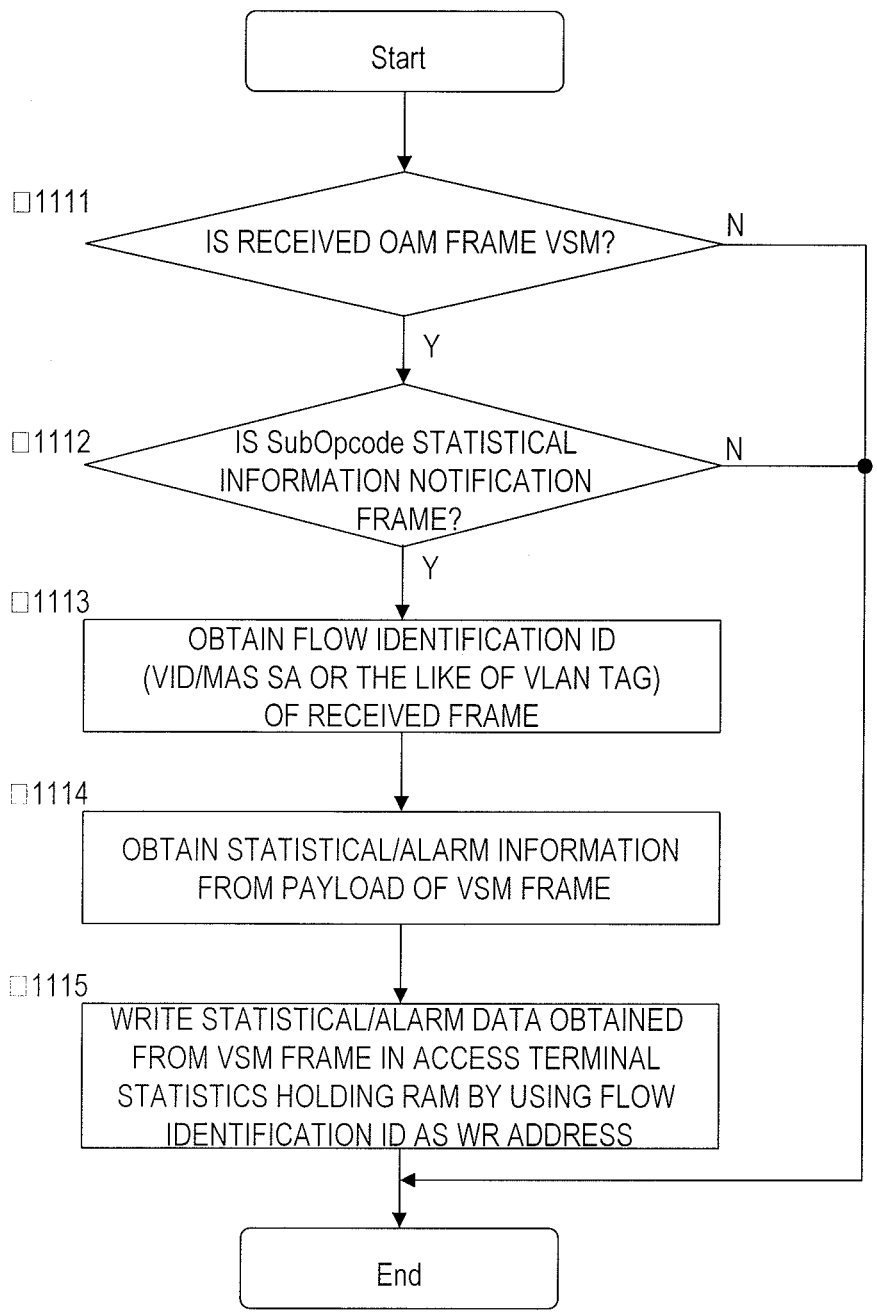
FIG. 11B is a flowchart illustrating a procedure of processing when the OAM processing unit of the carrier edge node receives the VSM frame containing the pieces of statistical information or alarm information of the first embodiment of this invention.

FIG. 11B is a flowchart illustrating a procedure of processing when the OAM processing unit 215 of the carrier edge node 20 of the first embodiment of this invention receives the VSM frame 70 containing the pieces of statistical information or alarm information 301-n and 302-n.

The OAM processing unit 215 of the carrier edge node 20 first judges whether or not the received OAM frame is the VSM frame 70 (S1111). If the received OAM frame is not the VSM frame 70 (result of S1111 is "N"), the processing is finished to carry out the normal OAM frame reception processing.

If the received frame is the VSM frame 70 (result of S1111 is "Y"), the OAM processing unit 215 of the carrier edge node 20 obtains the SubOpcode from the received frame to check whether or not the SubOpcode is a statistical information notification frame (S1112). If the SubOpcode is not a statistical information notification frame (result of S1112 is "N"), the processing is finished to carry out the normal OAM frame reception processing.

If the SubOpcode is a statistical information notification frame (result of S1112 is "Y"), the OAM processing unit 215 of the carrier edge node 20 obtains a flow identification ID from the received frame (S1113). The flow identification ID corresponds to the access terminal 10 which has transmitted the frame, and can be used as an identifier of the access terminal 10. The flow identification ID is, for example, MAC SA.

The OAM processing unit 215 of the carrier edge node 20 obtains statistical/alarm information from a payload of the received VSM frame (S1114). In other words, the OAM processing unit 215 obtains the statistical/alarm storage area stored after a recommendation defining field (8 bytes) and a SubOpcode (1 byte) stored at the head.

The OAM processing unit 215 of the carrier edge node 20 writes obtained 32-byte information in the access terminal statistics holding RAM based on the flow identification ID obtained in Step S1113 (S1115). As illustrated in FIG. 5, an address of the access terminal statistics holding RAM corresponds to an identification ID of the access terminal, and can be obtained from the flow identification ID.

The VSM frame 70 has a variable payload. Thus, the payload can be increased according to the amount of statistical or alarm information which has to be notified of, and a great amount of information can be supplied from the access terminal 10 to the carrier edge node 20 at a time.

According to the first embodiment of this invention, measuring statistical information containing an amount of data transferred via the access terminal 10 to transmit the statistical information to the carrier edge node 20 enables clarification of a point of data discarded in the network.

Specifically, when an amount of data which the access terminal 10 has received from the user site 30 is larger than an amount of data transmitted to the access network 40, it can be understood that data has been discarded in the access network 40. When an amount of data transmitted from the access terminal 10 to the access network 40 is larger than an amount of data which the carrier edge node 20 has received from the access network 40, it can be understood that data has been discarded in the access network 40.

Failure alarm or communication alarm generated in the access terminal 10 can be monitored to be transmitted to the carrier edge node. Pieces of alarm information conventionally unidentifiable until a maintenance engineer visits an installing place of the access terminal 10 can be collected from the carrier edge node 20, and a cause of data discarding can be specified.

Thus, in the guarantee dedicated line services, when discarding of transferred data disables securing of a guaranteed bandwidth, a cause can be specified to clarify a locus of responsibility.

The access terminal 10 can collect all pieces of assumable statistical/alarm information. However, the number of access terminals 10 is large as compared with that of carrier edge nodes 20, and accordingly the access terminals 10 are preferably provided at low prices. Thus, according to the first embodiment of this invention, the access terminal 10 always collects/holds not all pieces of statistical/alarm information but only pieces of statistical/alarm information designated by the carrier edge node 20. As a result, reductions of the memory capacity and the logical area of the hardware can be expected to realize low prices.

Second Embodiment

The first embodiment of this invention targets guarantee services such as dedicated line services. According to a second embodiment of this invention, however, the invention is applied to best-effort Internet services.

In the best-effort Internet services, no bandwidth is secured for each user. Thus, when a certain user occupies a bandwidth by using P2P software, a network may be congested, and other users may have difficulties of securing bandwidths to be used.

Thus, according to the second embodiment of this invention, as described in items (1) and (2) below, network congestion is reduced by controlling a bandwidth based on collected pieces of statistical information.

(1) The number of upward data-discarded frames in an access network 40 can be understood for each user based on a difference between NNI transmission statistics of an access terminal 10 and reception statistics of a carrier edge node 20. Monitoring a traffic amount enables accurate bandwidth understanding. Based on the understood information, a user who transmits much data, causing network congestion, can be specified. A setting bandwidth of an upward bandwidth control unit of the access terminal 10 is lowered by using a CC frame 60 or a VSM frame 70 transmitted to the access terminal 10, whereby the network congestion can be reduced.

(2) The number of downward data-discarded frames in the access network 40 can be obtained for each user based on a difference between NNI reception statistics of the access terminal 10 and transmission statistics of the carrier edge node 20. Based on the obtained number of downward data-discarded frames, a user who transmits much data, causing network congestion, can be specified. By lowering a setting bandwidth of the congestion-causing user at a downward traffic control block of the carrier edge node 20, the network congestion can be reduced.

After a network status has been improved, the bandwidth limits set in the items (1) and (2) are released. Whether or not the network status has been improved can be judged by referring to statistical information.

In the second embodiment of this invention, description of contents similar to those of the first embodiment of this invention is omitted as appropriate.

Figure 13:
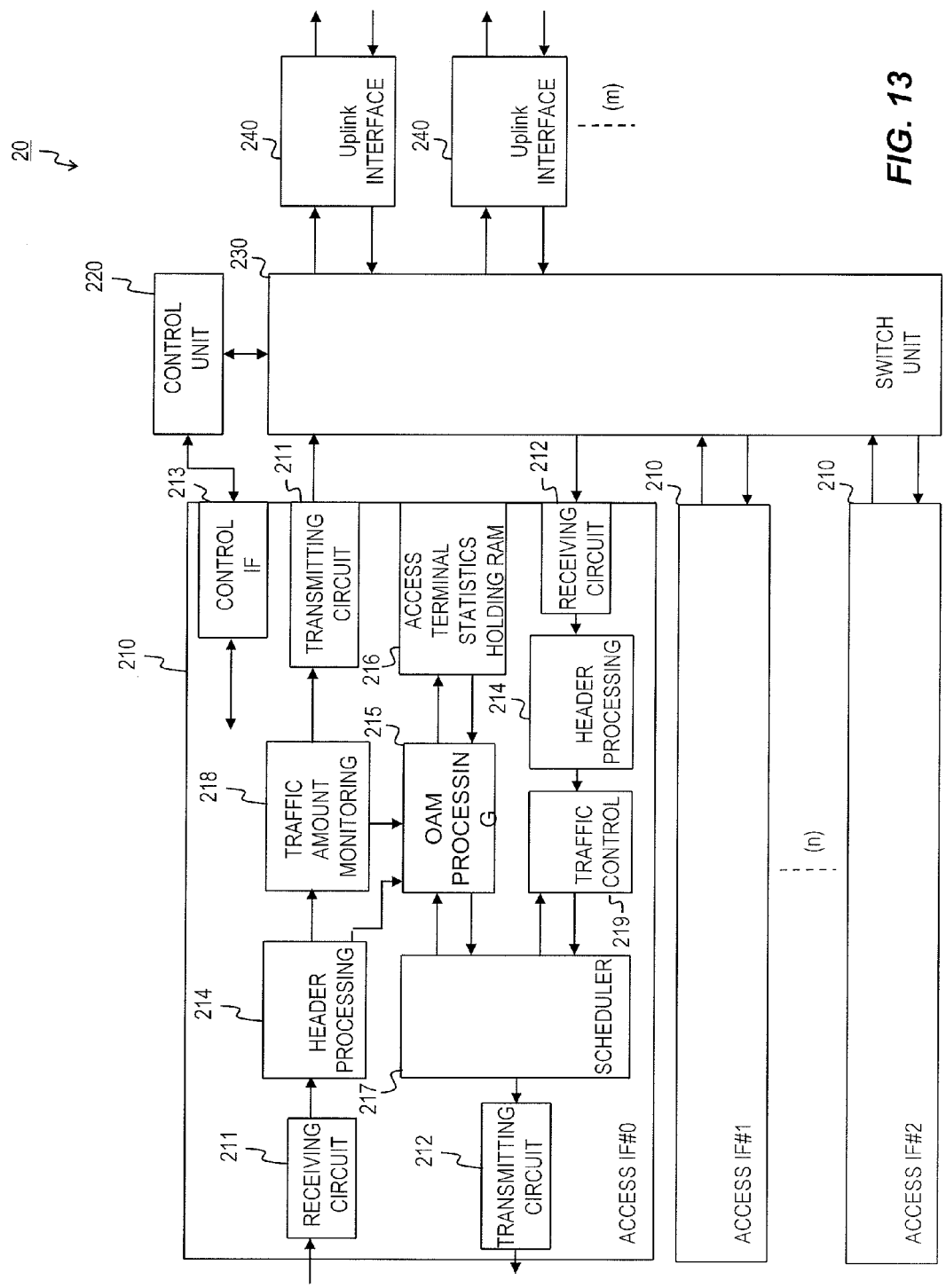
FIG. 13 is a block diagram illustrating a configuration of the carrier edge node according to a second embodiment of this invention.

FIG. 13 is a block diagram illustrating a configuration of the carrier edge node 20 according to the second embodiment of this invention.

The carrier edge node 20 of the second embodiment of this invention includes, in addition to the components of the carrier edge node 20 of the first embodiment of this invention illustrated in FIG. 4, a traffic amount monitoring unit 218 and a traffic control unit 219.

The traffic amount monitoring unit 218 monitors an amount of data (traffic amount) transmitted from the access network 40, and notifies, if the traffic amount exceeds a predetermined threshold value, an OAM control unit 215 of the above.

Having successfully checked that the traffic amount has exceeded the threshold value from the traffic amount monitoring unit 218, and that frame discarding has occurred in the access network based on upward statistical information of an excess-traffic-causing user, the OAM processing unit 215 supplies a bandwidth update command by using the CC frame or the VSM frame transmitted to the access terminal 10 so as to lower an upward setting bandwidth of the access terminal 10.

The traffic control unit 219 controls an amount of data transmitted to the access network 40 by controlling a bandwidth.

Figure 14:
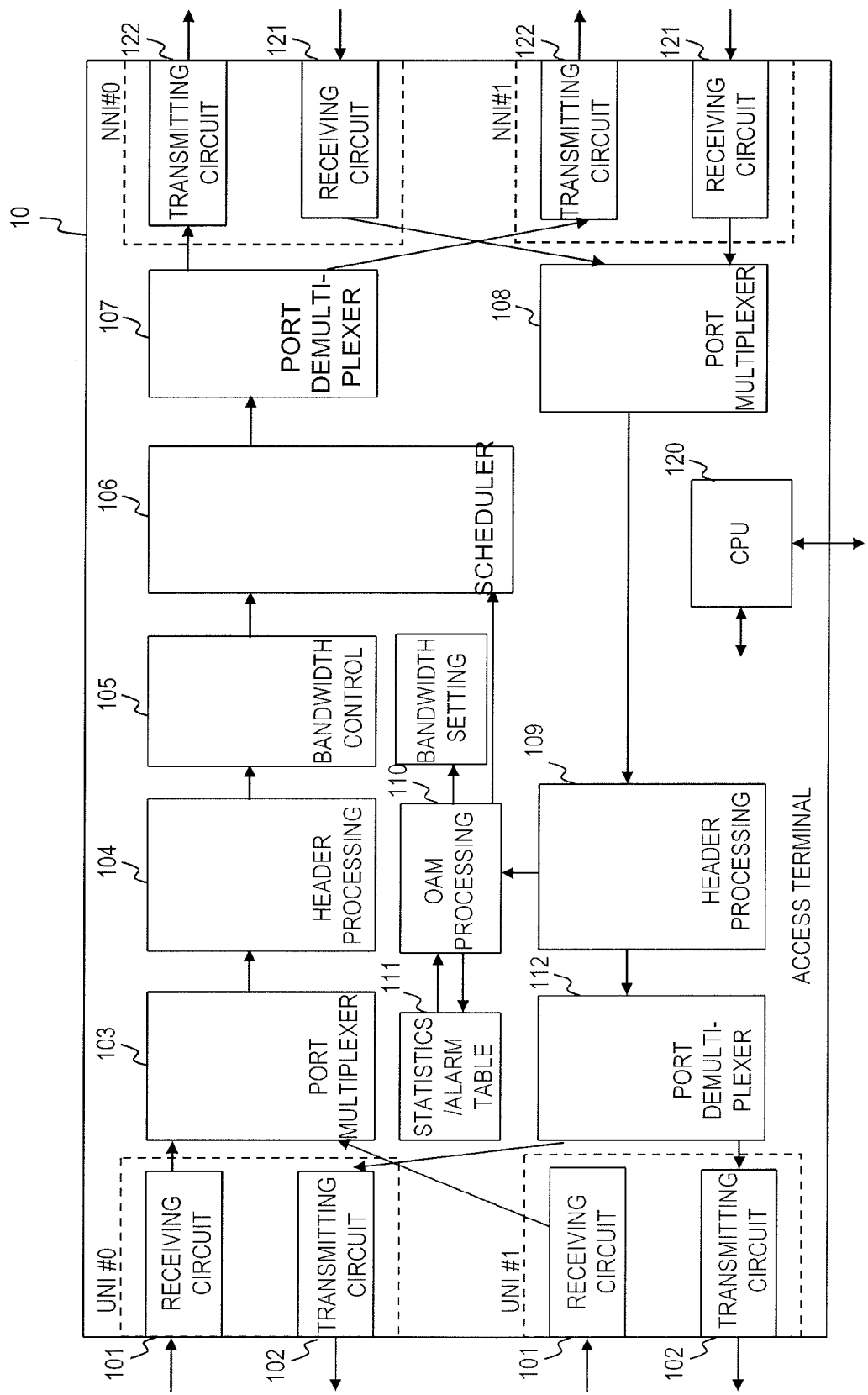
FIG. 14 is a block diagram illustrating a configuration of the access terminal according to the second embodiment of this invention.

FIG. 14 is a block diagram illustrating a configuration of the access terminal 10 according to the second embodiment of this invention.

The access terminal 10 of the second embodiment of this invention includes a bandwidth setting unit 113 in addition to the components of the access terminal 10 of the first embodiment of this invention illustrated in FIG. 8.

When the CC frame 60 or the VSM frame 70 transmitted from the carrier edge node 20 contains a bandwidth update command, an OAM processing unit 110 of the access terminal 10 instructs the bandwidth setting unit 113 to update a bandwidth. The bandwidth update command is contained in the CC frame 60 or the VSM frame 70 transmitted from the carrier edge node 20 as described above.

The bandwidth setting unit 113 changes a setting bandwidth based on the bandwidth update command notified of from the carrier edge node 20.

Figure 15:
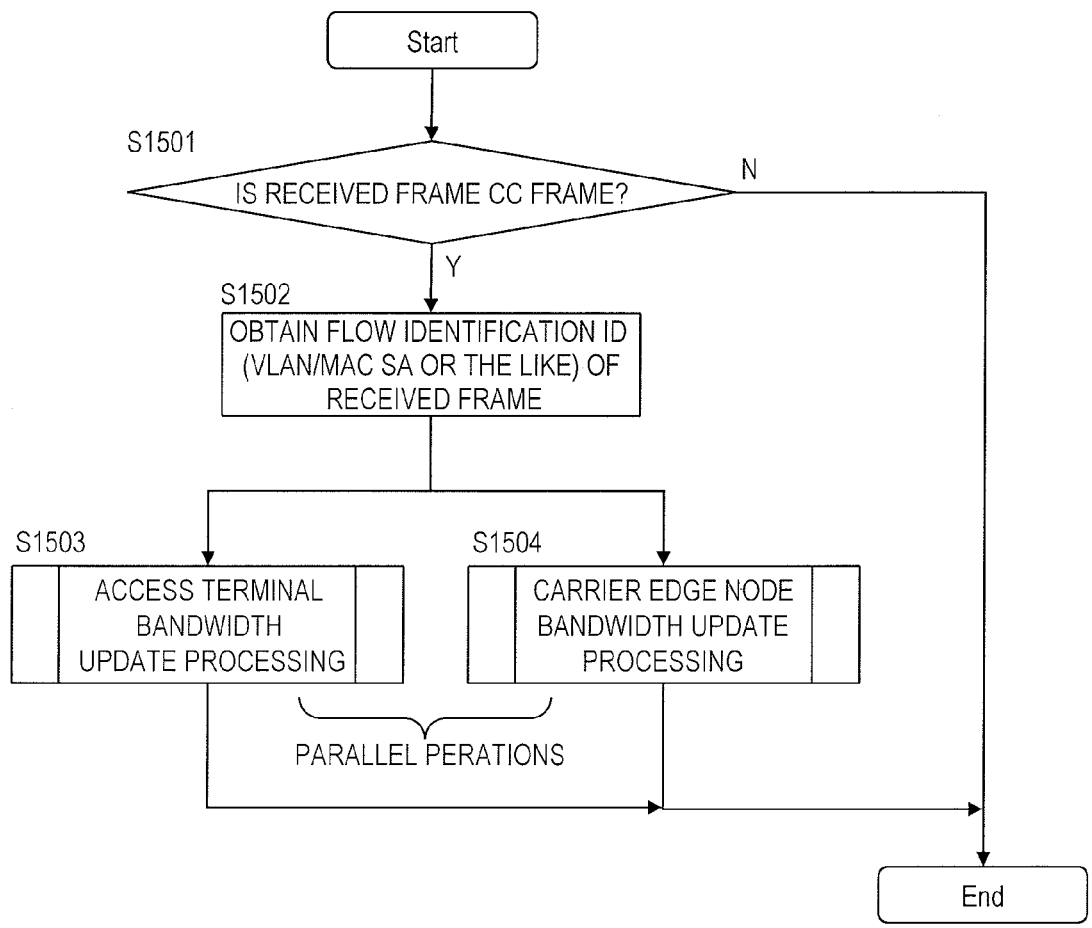
FIG. 15 is a flowchart illustrating a procedure of processing executed by the OAM processing unit of the carrier edge node according to the second embodiment of this invention.

FIG. 15 is a flowchart illustrating a procedure of processing executed by the OAM processing unit 215 of the carrier edge node 20 according to the second embodiment of this invention.

The OAM processing unit 215 of the carrier edge node 20 first judges whether or not received OAM frame is the CC frame 60 (S1501). If the received OAM frame is an OAM frame other than the CC frame 60 (result of S1501 is "N"), the processing is finished to carry out normal Ethernet OAM processing.

If the received frame is the CC frame 60 (result of S1501 is "Y"), the OAM processing unit 215 of the carrier edge node 20 obtains a flow identification ID from the received frame (S1502).

After completion of Step S1502, the OAM processing unit 215 of the carrier edge node 20 executes bandwidth control processing of the access terminal 10 (S1503) and bandwidth control processing of the carrier edge node 20 (S1504) in parallel. The bandwidth control processing of the access terminal 10 (S1503) and the bandwidth control processing of the carrier edge node 20 (S1504) are described below respectively referring to FIG. 16 and FIG. 17.

Figure 16:
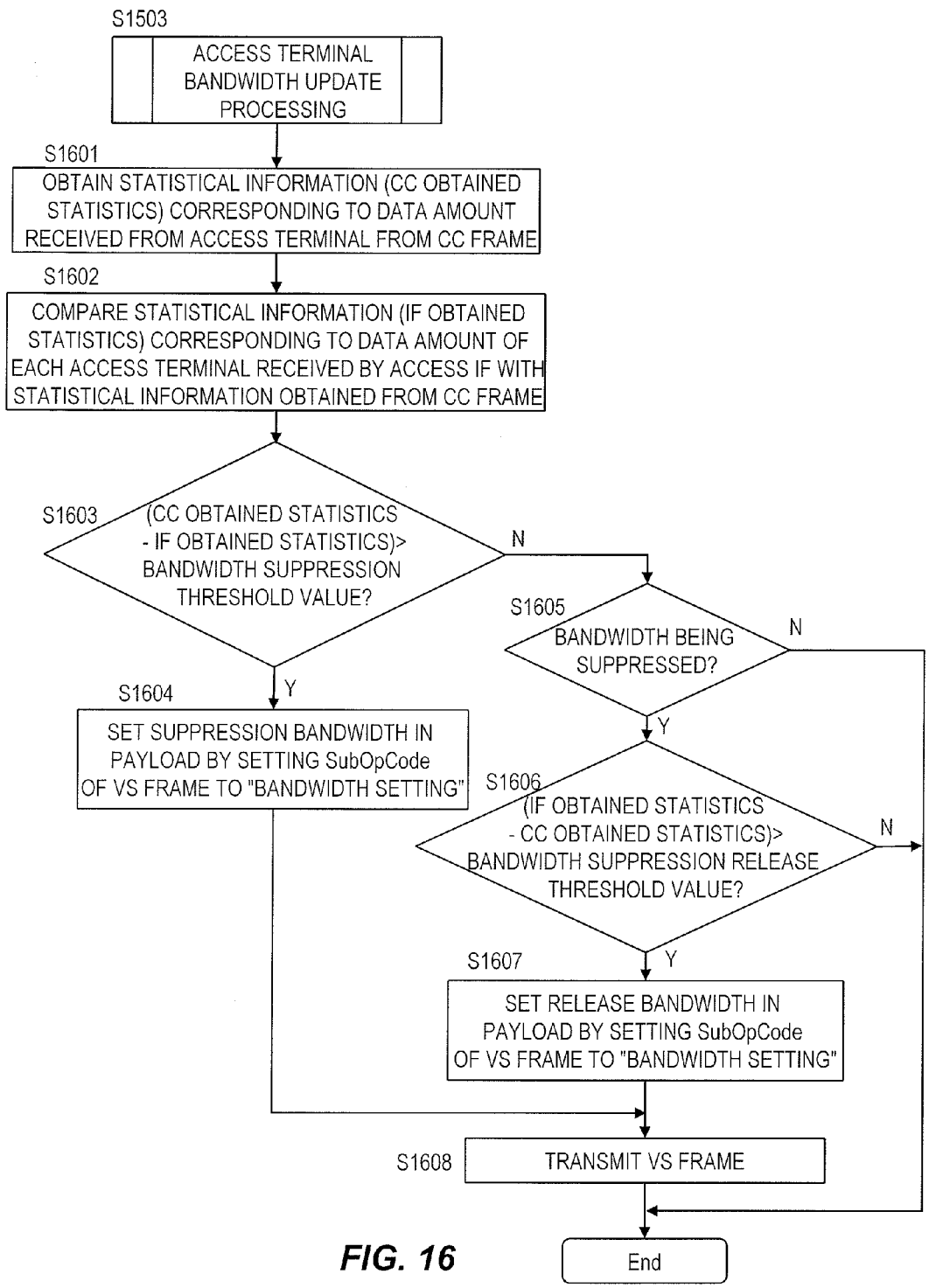
FIG. 16 is a flowchart illustrating a procedure in which the carrier edge node instructs bandwidth control of the access terminal according to the second embodiment of this invention.

FIG. 16 is a flowchart illustrating a procedure in which the carrier edge node 20 of the second embodiment of this invention instructs bandwidth control of the access terminal 10.

This processing is executed by the OAM processing unit 215 of the carrier edge node 20, and includes processing to transmit the VSM frame 70 containing a bandwidth changing instruction to the access terminal 10.

The OAM processing unit 215 of the carrier edge node 20 obtains from the received CC frame 60 statistical information corresponding to an amount of data transmitted from the access terminal 10 (S1601).

The OAM processing unit 215 of the carrier edge node 20 compares statistical information corresponding to the amount of the data for each access terminal 10 received by an access IF 210 of the carrier edge node 20 with the statistical information obtained in Step S1601 (S1602).

The OAM processing unit 215 of the carrier edge node 20 judges whether or not a difference between the statistical information obtained from the CC frame 60 and the statistical information obtained by the access IF 210 is larger than a predefined bandwidth suppression threshold value (S1603). The difference between the statistical information obtained from the CC frame 60 and the statistical information obtained by the access IF 210 corresponds to an amount of data discarded in the access network 40 when data is transmitted from the access terminal 10 to the carrier edge node 20. In other words, in Step S1603, the OAM processing unit 215 judges whether or not the amount of data discarded in the access network 40 is larger than the bandwidth suppression threshold value.

If the amount of the data discarded in the access network 40 is larger than the bandwidth suppression threshold value (result of S1603 is "Y"), the OAM processing unit 215 of the carrier edge node 20 sets "bandwidth setting" in a SubOpCode 72 of the VSM frame 70, and a suppression bandwidth in a payload (S1604).

On the other hand, if the amount of the data discarded in the access network 40 is equal to or less than the bandwidth suppression threshold value (result of S1603 is "N"), the OAM processing unit 215 of the carrier edge node 20 judges whether or not bandwidth suppressing is currently executed in the access terminal 10 (S1605). If no bandwidth suppression is currently executed in the access terminal 10 (result of S1605 is "N"), the processing is finished.

The OAM processing unit 215 of the carrier edge node 20 judges whether or not the difference between the statistical information obtained by the access IF 210 and the statistical information obtained from the CC frame 60 is smaller than a predefined bandwidth suppression release threshold value (S1606). In other words, in Step S1606, the OAM processing unit 215 judges whether to release bandwidth suppression because the amount of the data discarded in the access network 40 is sufficiently small.

If the amount of the data discarded in the access network 40 is not sufficiently small (result of S1606 is "N"), the OAM processing unit 215 of the carrier edge node 20 finishes the processing.

If the amount of the data discarded in the access network 40 is sufficiently small (result of S1606 is "Y"), the OAM processing unit 215 of the carrier edge node 20 sets "bandwidth setting" in the SubOpCode 72 of the VSM frame 70, and a suppression bandwidth in a payload (S1607).

The OAM processing unit 215 of the carrier edge node 20 transmits the generated VSM frame 70 to the access terminal 10 after completion of Step S1604 or S1607 (S1608).

Figure 17:
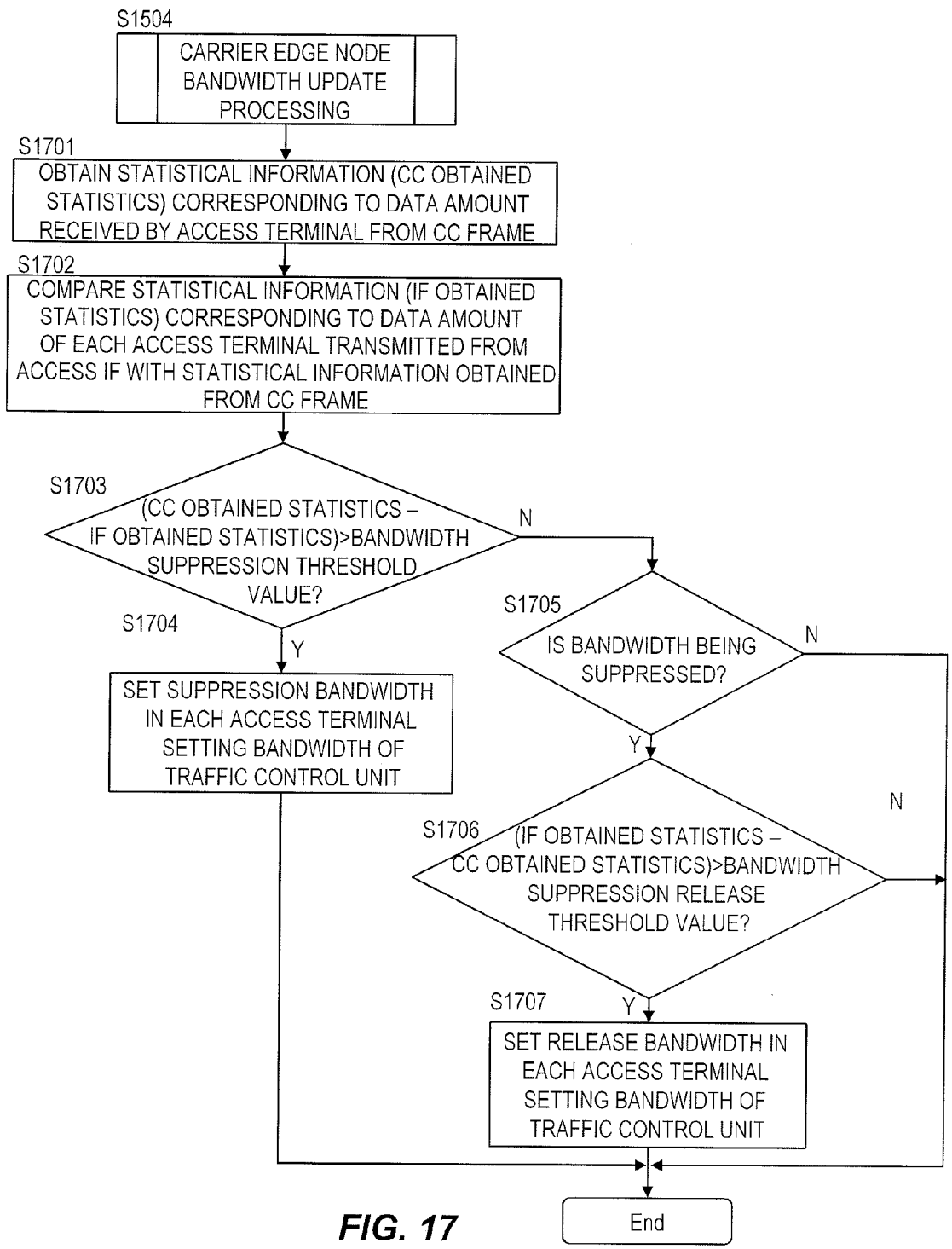
FIG. 17 is a flowchart illustrating a procedure of executing bandwidth control for the carrier edge node according to the second embodiment of this invention.

FIG. 17 is a flowchart illustrating a procedure of executing bandwidth control for the carrier edge node 20 according to the second embodiment of this invention.

The OAM processing unit 215 of the carrier edge node 20 obtains from the received CC frame 60 statistical information corresponding to an amount of data received by the access terminal 10 (S1701).

The OAM processing unit 215 of the carrier edge node 20 compares statistical information corresponding to the amount of the data for each access terminal 10 transmitted from the access IF 210 of the carrier edge node 20 with the statistical information obtained in Step S1701 (S1702).

The OAM processing unit 215 of the carrier edge node 20 judges whether or not a difference between the statistical information obtained from the CC frame 60 and the statistical information obtained by the access IF 210 is larger than a predefined bandwidth suppression threshold value (S1703). The difference between the statistical information obtained from the CC frame 60 and the statistical information obtained by the access IF 210 corresponds to an amount of data discarded in the access network 40 when data is transmitted from the carrier edge node 20 to the access terminal 10. In other words, in Step S1703, the OAM processing unit 215 judges whether or not the amount of data discarded in the access network 40 is larger than the bandwidth suppression threshold value.

If the amount of the data discarded in the access network 40 is larger than the bandwidth suppression threshold value (result of S1703 is "Y"), the OAM processing unit 215 of the carrier edge node 20 sets a suppression bandwidth in an each-access terminal setting bandwidth by the traffic control unit 219 (S1704).

On the other hand, if the amount of the data discarded in the access network 40 is equal to or less than the bandwidth suppression threshold value (result of S1703 is "N"), the OAM processing unit 215 of the carrier edge node 20 judges whether or not bandwidth suppressing is currently executed in the traffic control unit 219 (S1705). If no bandwidth suppression is currently executed in the carrier edge node 20 (result of S1705 is "N"), the processing is finished.

The OAM processing unit 215 of the carrier edge node 20 judges whether or not the difference between the statistical information obtained by the access IF 210 and the statistical information obtained from the CC frame 60 is smaller than a predefined bandwidth suppression release threshold value (S1706). In other words, in Step S1706, the OAM processing unit 215 judges whether to release bandwidth suppression because the amount of the data discarded in the access network 40 is sufficiently small.

If the amount of the data discarded in the access network 40 is not sufficiently small (result of S1706 is "N"), the OAM processing unit 215 of the carrier edge node 20 finishes the processing.

If the amount of the data discarded in the access network 40 is sufficiently small (result of S1706 is "Y"), the OAM processing unit 215 of the carrier edge node 20 sets a release bandwidth in the each-access terminal setting bandwidth by the traffic control unit 219 (S1707).

According to the second embodiment of this invention, a congestion situation of the access network can be collected in real time based on the collected pieces of statistical information, and network congestion can be effectively reduced by controlling a bandwidth based on the congestion information.

While the present invention has been described in detail and pictorially in the accompanying drawings, the present invention is not limited to such detail but covers various obvious modifications and equivalent arrangements, which fall within the purview of the appended claims.

What is claimed is:

1. A network system for collecting, in a network including an access network and a transport network, pieces of statistical information including a traffic amount of the network and alarm information, comprising:
   an access terminal coupled to the access network; and
   an edge node for interconnecting the access network and the transport network,
   wherein the access terminal is configured to:
   measure pieces of statistical information including a traffic amount in the access terminal itself, and detect a device alarm and a communication alarm of the access terminal; and
   notify the edge node of the measured pieces of statistical information, and the device alarm and the communication alarm of the access terminal;
   wherein the edge node is configured to:
   collect the pieces of statistical information and device alarm and the communication alarm of the access terminal, notified by the access terminal;
   measure a traffic amount received from the access network;
   collect, from the access terminal, a traffic amount transmitted from the access terminal to the access network;
   calculate a difference between the measured traffic amount and the traffic amount collected from the access terminal;
   notify, in a case where the calculated difference is larger than a predetermined first threshold value, the access terminal of a bandwidth set in a manner that the traffic amount transmitted from the access terminal to the access network is smaller than a predetermined traffic amount;
   notify, in a case where the calculated difference is smaller than a predetermined third threshold value, the access terminal of a bandwidth set in a manner that the traffic amount transmitted from the access terminal to the access network is larger than a predetermined traffic amount; and
   wherein the access terminal is further configured to limit, based on the notified bandwidth, the traffic amount transmitted from the access terminal to the access network.

2. The network system according to claim 1,
   wherein the edge node is further configured to transmit, to the access terminal, a frame including an instruction of starting collection of the pieces of statistical information and the device alarm and the communication alarm of the access terminal; and
   wherein the access terminal is further configured to start, in a case of receiving the frame including the instruction, the measuring of the pieces of statistical information and detecting of the device alarm and the communication alarm of the access terminal.

3. The network system according to claim 1,
   wherein the edge node is further configured to transmit, to the access terminal, a frame designating a type of the pieces of statistical information to be collected; and
   wherein the access terminal is further configured to:
   measure, in the case of receiving the frame designating the type of the pieces of statistical information to be collected, the pieces of statistical information designated by the frame; and
   transmit, to the edge node, the measured pieces of statistical information.

4. The network system according to claim 1, wherein the edge node is further configured to:
   measure a traffic amount transmitted to the access network;
   collect, from the access terminal, a traffic amount received from the access network to the access terminal;
   control, in a case where the calculated difference is larger than a predetermined second threshold value, the traffic amount transmitted to the access network to be smaller than a predetermined traffic amount; and
   control, in a case where the calculated difference is smaller than a predetermined second threshold value, the traffic amount transmitted to the access network to be larger than a predetermined traffic amount.

5. A network system according to claim 1,
   wherein the edge node is configured to effect checking of continuity from the access terminal to the edge node, by transmitting a continuity check frame instructing statistical information and alarm information to be obtained by the access terminal; and
   the access terminal is configured to collect, after having received the control frame, only pieces of the measured pieces of statistical information, and
   the device alarm and the communication alarm of the access terminal, as designated by the continuity check frame, and to periodically transmit the only pieces of the measured pieces of statistical information, and the device alarm and the communication alarm of the access terminal, to the edge node.

6. An edge node included in a network system for collecting, in a network including an access network and a transport network, pieces of statistical information including a traffic amount of the network and alarm information,
   the network system comprising an access terminal coupled to the access network, wherein the access terminal is configured to:
   measure pieces of statistical information including a traffic amount in the access terminal itself, and detect a device alarm and a communication alarm of the access terminal; and
   notify the edge node of the measured pieces of statistical information, and the device alarm and the communication alarm of the access terminal;
   the edge node being configured to:
   collect the pieces of statistical information and the device alarm and the communication alarm of the access terminal, notified by the access terminal;
   measure a traffic amount received from the access network;
   collect, from the access terminal, a traffic amount transmitted from the access terminal to the access network;

calculate a difference between the measured traffic amount and the traffic amount collected from the access terminal;

notify, in a case where the calculated difference is larger than a predetermined first threshold value, the access terminal of bandwidth set in a manner that the traffic amount transmitted from the access terminal to the access network is smaller than a predetermined traffic amount;

notify, in a case where the calculated difference is smaller than a predetermined third threshold value the access terminal of a bandwidth set in a manner that the traffic amount transmitted from the access terminal to the access network is larger than a predetermined traffic amount; and wherein the access terminal is further configured to limit, based on the notified bandwidth, the traffic amount transmitted from the access terminal to the access network.

7. The edge node according to claim 6, wherein the pieces of statistical information are notified responsive to a continuity check frame sent by the edge node to the access terminal, for checking continuity from the access terminal to the edge node.

8. The edge node according to claim 6, further being configured to:

transmit, to the access terminal, a frame including an instruction of starting collection of the pieces of statistical information.

9. The edge node according to claim 6, further being configured to:

transmit, to the access terminal, a frame designating a type of the pieces of statistical information to be collected.

10. An edge node included in a network system for collecting, in a network including an access network and a transport network, pieces of statistical information including a traffic amount of the network and alarm information, the network system comprising an access terminal coupled to the access network, wherein the access terminal is configured to:

measure pieces of statistical information including a traffic amount in the access terminal itself, and detect a device alarm and a communication alarm of the access terminal; and notify the edge node of the measured pieces of statistical information, and the device alarm and the communication alarm of the access terminal;

the edge node being configured to:

collect the pieces of statistical information and the device alarm and the communication alarm of the access terminal, notified by the access terminal;

measure a traffic amount transmitted to the access network;

collect, from the access terminal, a traffic amount received from the access network to the access terminal;

calculate a difference between the measured traffic amount and the traffic amount collected from the access terminal;

control, in a case where the calculated difference is larger than a predetermined second threshold value, the traffic amount transmitted to the access network to be smaller than a predetermined traffic amount; and control, in a case where the calculated difference is smaller than a predetermined second threshold value, the traffic amount transmitted to the access network to be larger than a predetermined traffic amount.

* * * * *